(12) United States Patent
Mattila et al.

(10) Patent No.: US 8,275,394 B2
(45) Date of Patent: Sep. 25, 2012

(54) NOKIA PLACES FLOATING PROFILE

(75) Inventors: Samuli Mattila, Berlin (DE); Andreas Hoffmann, Berlin (DE)

(73) Assignee: Nokia Corporation, Espoo (FI)

( * ) Notice: Subject to any disclaimer, the term of this patent is extended or adjusted under 35 U.S.C. 154(b) by 919 days.

(21) Appl. No.: 12/052,352

(22) Filed: Mar. 20, 2008

(65) Prior Publication Data

US 2009/0241040 A1    Sep. 24, 2009

(51) Int. Cl.
*H04W 24/00*    (2009.01)

(52) U.S. Cl. ............... 455/456.3; 455/456.1; 455/456.2; 701/200; 701/207; 709/203; 709/229; 715/75; 715/205; 715/235

(58) Field of Classification Search ............... 455/456.1, 455/456.2, 456.3; 701/200, 207; 709/203, 709/229; 715/75, 205, 235

See application file for complete search history.

(56) References Cited

U.S. PATENT DOCUMENTS

| | | |
|---|---|---|
| 2006/0089792 A1 | 4/2006 | Manber et al. |
| 2008/0033652 A1 | 2/2008 | Hensley et al. |
| 2010/0113062 A1* | 5/2010 | Lee et al. ................... 455/456.1 |

FOREIGN PATENT DOCUMENTS

| | | |
|---|---|---|
| EP | 1 460 586 A2 | 9/2004 |
| WO | 0217567 A2 | 2/2002 |
| WO | 2004088482 A2 | 10/2004 |

OTHER PUBLICATIONS

International Search Report for corresponding PCT Application No. PCT/FI2009/050212 dated Jun. 24, 2009, pp. 1-13.
Korean Office Action for KR Application No. 2010-7023335 dated Oct. 19, 2011, pp. 1-5.
Russian Office Action for RU Application No. 2010142364/07 (060871) dated Nov. 24, 2011, pp. 1-9.
Korean Office Action for related Korean Application No. 2010-7023335 dated May 8, 2012, pp. 1-11.

* cited by examiner

*Primary Examiner* — Amancio Gonzalez
(74) *Attorney, Agent, or Firm* — Ditthavong Mori & Steiner, P.C.

(57) ABSTRACT

A method and system for marking a location with a mobile device, uploading location information from the marked location to a location based service, creating a web page for the location information, and adding descriptive content to the web page pertaining to the location.

19 Claims, 16 Drawing Sheets

NOKIA PLACES FLOATING PROFILE

BACKGROUND

1. Field

The disclosed embodiments generally relate to user interfaces and, more particularly, to a service that stores, manages, aggregates, collaborates and shares user generated content, particularly with respect to maps and location based services.

2. Brief Description of Related Developments

Maps with static content are generally known. Users generally have the ability to navigate, search and plan, using these static map resources. It would be advantageous to be able to create a community based platform that enables a user to find, create, share and value location based information across web and mobile systems and devices.

SUMMARY

The aspects of the disclosed embodiments are directed to a method and system for marking a location with a mobile device, uploading location information from the marked location to a location based service, creating a web page for the location information, and adding descriptive content to the web page.

BRIEF DESCRIPTION OF THE DRAWINGS

The foregoing aspects and other features of the embodiments are explained in the following description, taken in connection with the accompanying drawings, wherein.

DETAILED DESCRIPTION OF THE EMBODIMENT(s)

Figure 1:
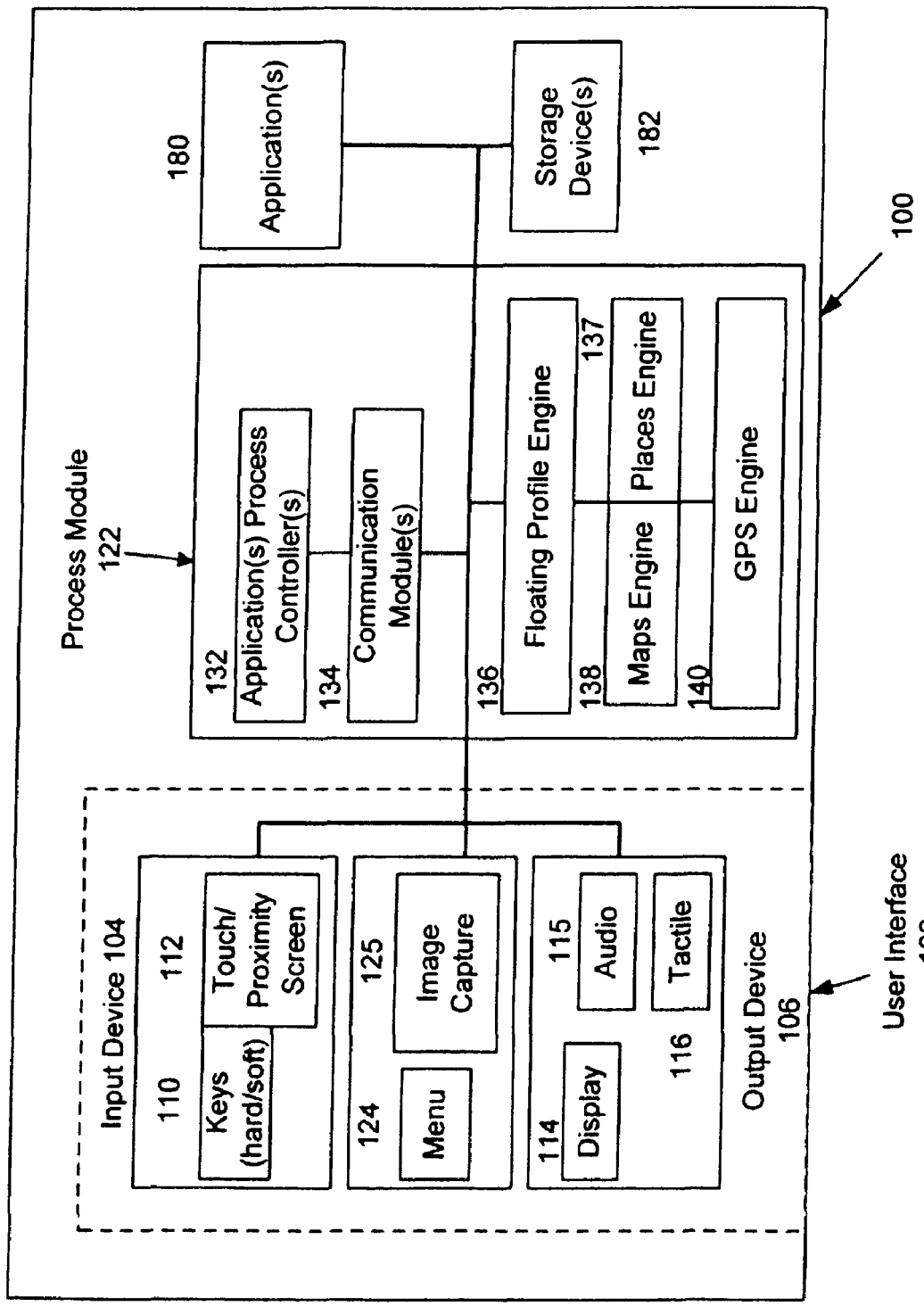
FIG. 1 shows a block diagram of a system in which aspects of the disclosed embodiments may be applied.

FIG. 1 illustrates one embodiment of a system 100 in which aspects of the disclosed embodiments can be applied. Although the disclosed embodiments will be described with reference to the embodiments shown in the drawings and described below, it should be understood that these could be embodied in many alternate forms. In addition, any suitable size, shape or type of elements or materials could be used.

The disclosed embodiments generally allow users to store, manage, aggregate, collaborate and share user generated content that is generally related to maps and location based services. The disclosed embodiments provide a location based service content model for web and mobile map users. Every location can be made into a "place", where "places" comprise open containers that aggregate location specific content. Every "place" will be a website that can be viewed online, using a mobile device or other Internet enabled device. The aspects of the disclosed embodiments will allow on-the-spot guidance with respect to locations, as well as allow for pre- and post-planning. Places can link to other places to open room for semantic layers. The more places (data) there are, the better the semantic social layer can create additional value to the users.

In one embodiment, city and city guides can be used as top level entities, which are then broken down to domains, subdomains and points of interest ("POI"). The city level can be used as a top down entry point for users. In alternate embodiments, and suitable location domain or level can be used as a top down entry point, such as for example, a country or nation. From the bottom up, individual points of interest can be used as the entry points, for example.

In one embodiment, the user information is stored in a floating profile. A floating profile is a roaming data container used to synchronize data between a places web service and a mobile terminal.

Figure 9:
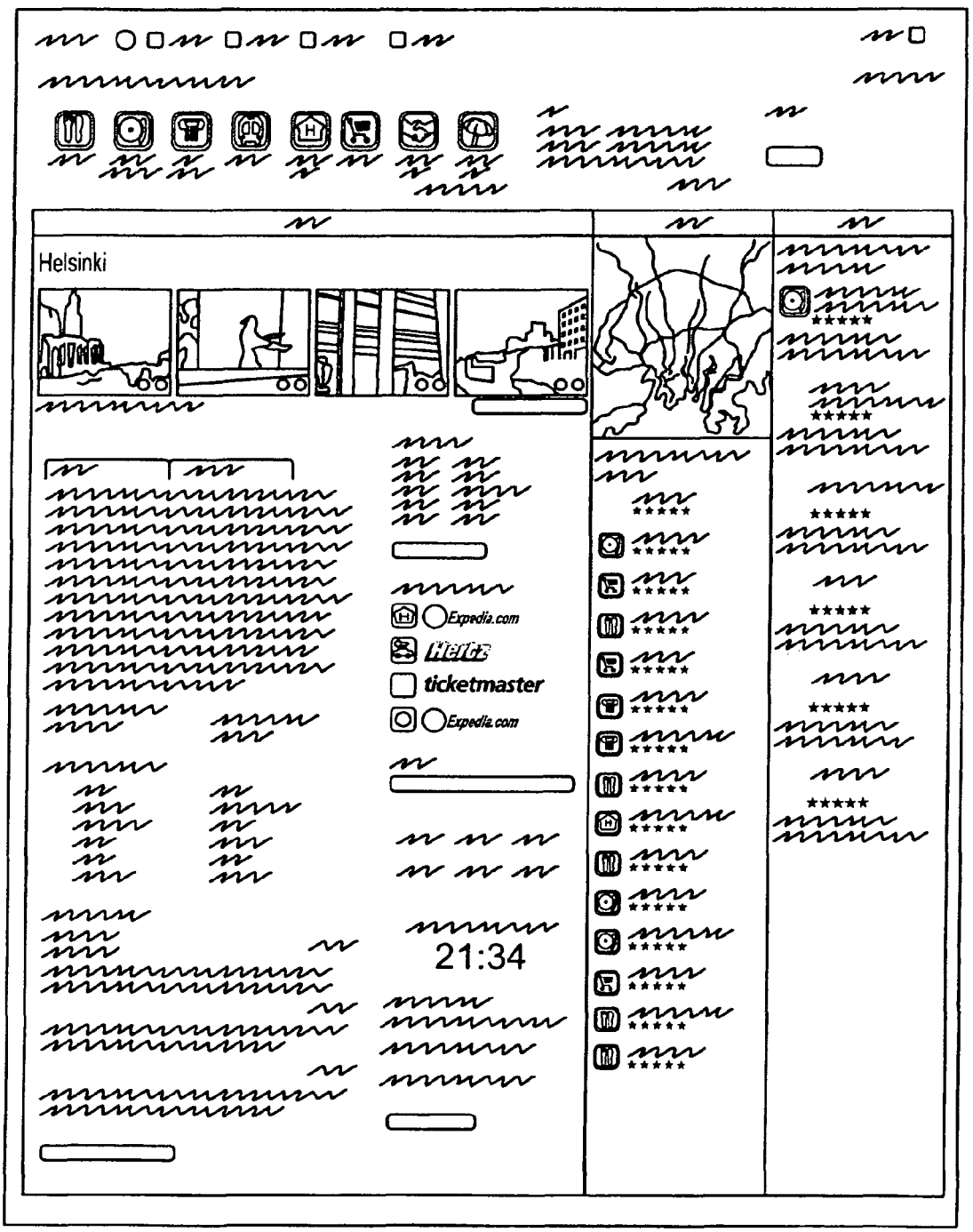
FIG. 9 illustrates one example of a user interface incorporating features of the disclosed embodiments.

The aspects of the disclosed embodiments relate to the ability to be able to mark a geographical location with a device and upload the marked location to a service. In one embodiment, a web page (URL address) can be created for the geographical location, if one does not already exist, content added to the web page, and the web page shared with other users. In one embodiment other users can also share and add content to the web page. Content can also be aggregated from third party services and provided on the web page or limited to the web page. The content is generally pertinent to the marked geographical location. Content can include for example, user generated content, branded content, branded listings, ticketing engines, dynamic services, proprietary user generated content, third party content and collaborative content. In alternate embodiments, the content can include any suitable content that may form part of or be added to a website or webpage. In one embodiment the content can be shown and/or access by HTML files or hyperlinks, server side content, A-Branded content, reviews and ratings or tags to explore. One example of a places webpage is illustrated in FIG. 9.

The aspects of the disclosed embodiments allow the web page to be accessed from all types of devices, including for example, mobile communication devices and PC's. The devices will generally be internet enabled or allow access websites and webpages in accordance with the aspects of the disclosed embodiments. In one embodiment, the user interface for the mobile device is the same as or consistent with the user interface on a PC or such other device. This can provide a seamless experience between the mobile device and the PC.

In one embodiment, a user is able to create a "place" using a mobile device, by marking the geographical location with the device. This can include taking a picture of the location or using a positioning function of the device to mark the approximate location using geographical coordinates. In one embodiment, when a picture is taken, the geographical position of the device is also recorded, such as for example, by tagging the position mark to the picture. In one embodiment, GPS coordinates are used to mark the location and are tagged to the picture, for example. In alternate embodiments, any suitable method can be used to mark a geographical location.

As an example, the GPS coordinates that correspond to a certain location can be received from a Near Field Communication ("NFC") tag associated with the location. A mobile device can include a NFC reader, which can read the coordinates from a suitable NFC transmitter or transceiver (tag). The location information can be moved, copied and/or read from the NFC tag to the mobile device, when for example the user takes a picture or otherwise chooses to "mark" the location. The location information can then be stored in conjunction with the picture (or other location identifier). For example, the user may associate a text tag, icon or other identifier with a marked location, rather than taking a picture of it. When the user access or retrieves the picture (or other location identifier), the location coordinates will also be made available. Similarly, if the coordinates are retrieved or accessed, the corresponding picture can be made available.

Figure 2:
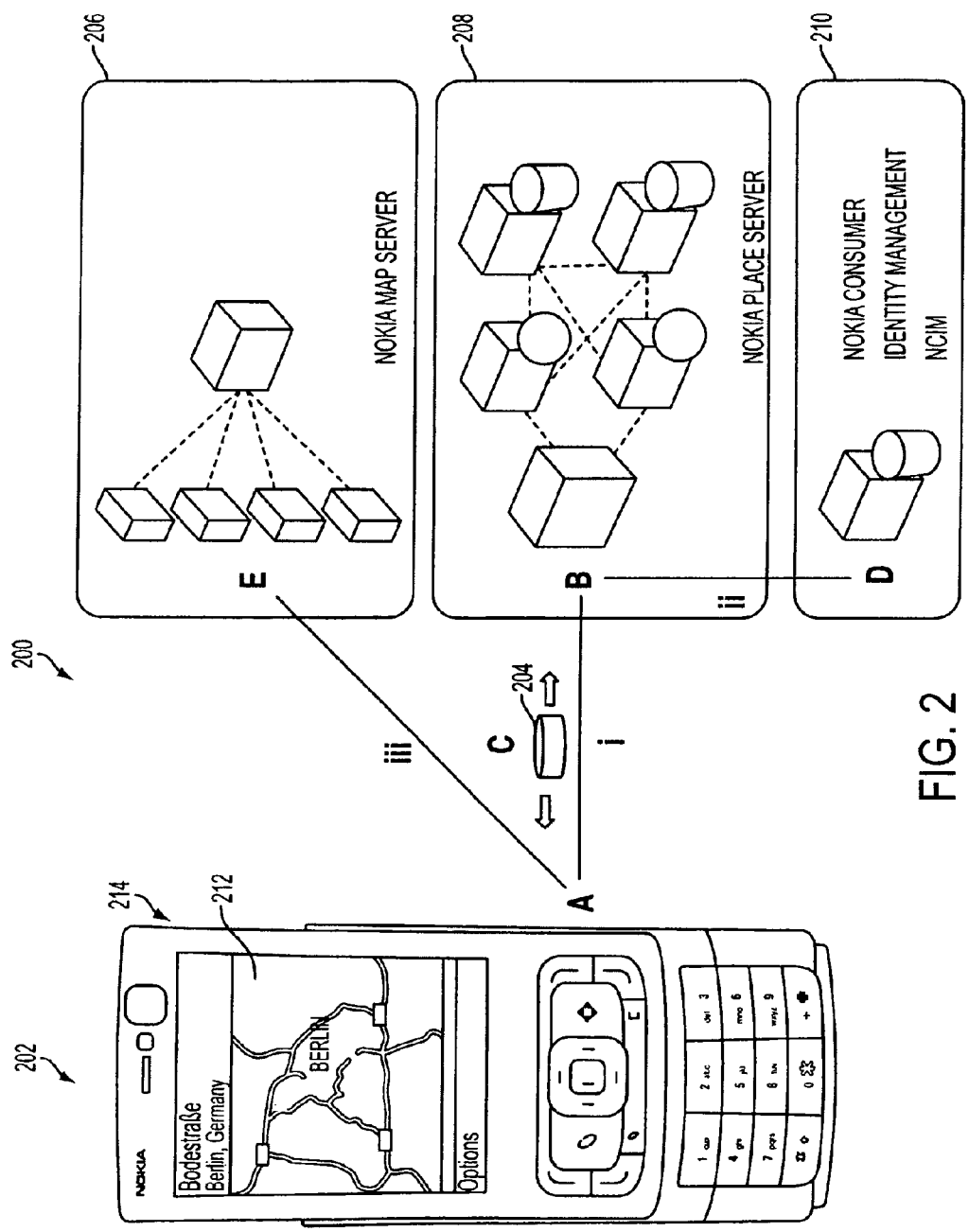
FIG. 2 is a block diagram of one example of a system incorporating aspects of the disclosed embodiments.

Referring to FIG. 2, in one embodiment, the picture and coordinates can be uploaded from the device 202 to a location-based service, or server 208. "Nokia Places ™" is one example of such a location-based service. In one embodiment, the server 208 will have an interface which receives tagged content, extracts the coordinates and puts the tagged picture on the respective place on the map view. This may also be a trigger for starting to generate a web page of predefined format by fetching relevant information for the place. In one embodiment a trigger for this kind of service, such as a "My Places" service, may be selected by user using the user interface of the phone or particular device 202. The places server 208 can comprises a maplet on top of the map server 206 of FIG. 2. The places server 208 can be unplugged from the map application to work independently from the map application.

The location-based service 208 can create or cause a web page to be created for the marked location, if such a page does not presently exist. In one embodiment, the location is marked on a corresponding geographical map of the area or region. When the map is being reviewed, a user will be able to see a mark or link for the site and be directed to the web page.

Once the site is created other users and subscribers will have the ability to access the web page and view the content and other information. In one embodiment, the user and others will have the ability to add content to the web page, such as for example, pictures, images, video and comments depending upon the permissions granted to the places service. Users may access the site using a mobile device or PC, for example. It is a feature of the disclosed embodiments that the user interface is common to and for both types of devices. The disclosed embodiments create a community based platform that allows users to find, create, share and value location based information across web and mobile based devices and platforms.

Referring to FIG. 2, one example of a system incorporating aspects of the disclosed embodiments is illustrated. In one embodiment, a device 202, such as for example a mobile terminal, is configured to be able to at least mark geographic locations, as well as access and download map service features. As shown in the example of FIG. 2, a map 212 is displayed on the user interface 214. Any suitable map service can be utilized to download map information. The mobile terminal 202 is generally configured to interface with a map server system 206, a place server 208 and an identity management system 210.

The map server system 206 generally comprises a map download service for mobile devices and terminals and provides, for example, map and search services. The places server 208 generally comprises an HTTP directory that is used to store user profile information in the network. The user profile information is provided by the floating profile 204, which moves, or transfers data and information, between the mobile terminal 202 and the server 208. The server 208 can store user profile information in a database or directory, such as a SQL database or LDAP directory, at a later stage. The server system 208 is generally responsible for the floating profile 204 version control, modification, mergers and managing version conflicts. The server system 208 can also serve as an authentication proxy for the mobile terminal and forward client authentication requests to the identify management system 210. The aspects of the disclosed embodiments generally provide for a single profile and single log-in/sign on for interaction with all areas of the service and devices.

In one embodiment, the identity management system 210 generally comprises a server that is used as a primary mobile terminal (MT) user authentication server. The identity management server 210 receives both mobile terminal 202 and web client authentication requests from the places server 208 over a secure connection. In one embodiment, the identity management system 210 can be referred to as a Nokia Consumer Identity Management System (NCIM).

The floating profile 204 can comprise a compressed XML container that enables the transport of geocoded and user community profile information over a connection, such as a low bandwidth connection for example. The XML format for storing information in the floating profile 204 allow for flexible extension of the floating profile 204. The floating profile 204 addresses community profile information synchronization between community web services, such as the places server 208, and the mobile terminal 202 and is generally responsible for automatic synchronization, version control and conflict resolution without user interaction. The synchronization protocol is scaleable, fault tolerant and robust, being able to work over unreliable low bandwidth networks with a user base of several millions. All synchronization events can be atomic, so that if synchronization is interrupted, the floating profile 204 (server) can perform an automatic rollback.

In one embodiment, an XML format is used due to web 2.0 service compatibility reasons and because it enables dynamic adding of new use fields. In alternate embodiments any suitable format can be used for storing information in the floating profile 204. The geocoded information can be stored in keyhole Mark-Up Language (KML) to provide compatibility with potential $3^{rd}$ party service providers and services. The floating profile 204 can also include version and time stamp information for version control and compatibility. Version history and modifications can be stored into a version control repository. The server repository will be able to roll back in time and restore older versions of the floating profile in the event that modifications need to be cancelled or recovered. The floating profile 204 allows the synchronization of data between the mobile device and the community, which generally comprises the places server 208. Since the mobile terminal 202 may not be connected to the web and the places server 100% of the time, the floating profile 204 provides the ability to mark a location, and/or add content, and upload this information from the terminal 202 to the places server 208 at a later time. The upload can occur in the background according to a synchronization protocol, and synchronisation can be transparent to the user.

In one embodiment, the floating profile 204 travels or transfer data between the mobile terminal 202 and the places server 208. If data in either the mobile terminal 202 or places server 208 is changed, the data is synchronised at a suitable point in time. There can be automatic conflict resolution in the floating profile, where the protocol is transparent to the user. In one embodiment, the places service 208 can be configured to manage the size, form and other dimensions of data presented, mainly in the form of a single web page.

In one embodiment, the mobile terminal 202, which can comprise a handheld terminal, or client, will generally incorporate a directory access client (HTTP) that is used to retrieve and deposit a user's floating profile 204 into a places directory 208. The mobile terminal 202 can include local storage for the floating profile 204 and a simple native user interface 214 for profile management. For security reasons, mobile terminal client authentication should be carried out over a secure connection.

The format for the floating profile 204 will generally include data such as, for example, placemarks, descriptive HTML in placemarks, routes, ground overlays and network links. Other information such as user profiling tags, version control and history information can also be included. Although XML language is indicated as the format for the storage of information in the floating profile 204, any suitable format can be used that allows the management of the display of three-dimensional geospatial data in application programs. The selected file format should be able to display geographic data in a map browser. For example, KML has a tag-based structure with names and attributes used for specific display purposes.

The floating profile client 204 is generally a polymorphic Symbian dll encapsulating all connectivity, storage and KML parsing functionality in one engine component, providing a package of functionality ready to be used from various applications. The dll can be linked against or loaded dynamically on-demand.

In one embodiment, there can be two instances of the floating profile 204, a terminal resident profile and a community resident profile. This can be beneficial when a user needs to access his profile information from anywhere at any time. However, the mobile device 202 is not always connected to the internet. With two instances of the floating profile 204, the user can view and edit profile information locally without a data connection. Once a data connection becomes available, the modifications can be relayed to the relevant community, in this example the places server 208. In one embodiment, the modifications are relayed transparently in the background once and when the data connection is established. Normal web users can access the community resident profile directly. Any changes made to the community resident profile can be relayed to the terminal resident profile when the connection to the terminal 202 becomes available.

The server system can be configured to offer to different entities, a platform to provide localized or personalized content, or advertisements, to the webpages based on the location and/or other attraction. In one embodiment, the server system can provide interfaces to be filled in by interested entities. For example, when the place page is created, selected entities, as determined by the service system or provider, can offer content that is unique to their service(s) on that page. When a location is rendered, the web content that is unique to the entity or entities will be available and visible on the page. The entities can tailor the available content to specific locations and maximize the visibility of the content to the user. In one embodiment, the server system can also collect usage information of the pages. This can include for example the number of visits or "hits" on a page, as well as the number of times a particular link is accessed. In alternate embodiments, any suitable statistics can be collected for analysis. Based on the usage the service system may provide the entities the statistics information and data. The usage can be a trigger for others to buy a presence in the popular pages.

In one embodiment, service providers or advertisers can identify locations or areas, such as by a set of given coordinates or coordinate groups, with which there advertisements should be associated. When a match is detected between the coordinates of a placed created or marked by a user, and the coordinates provided by an advertiser(s), the corresponding web page will automatically include or have added to it, the corresponding advertiser(s) content. For example, in one embodiment, an advertiser registers with the places server 208. The registration can include profile information and an indication of target categories of locations, or specific locations, with which they would like their advertisements or other content to appear. When a user creates or marks a place, and that information is transmitted to the places server 208, a comparison will be made between the location information provided by the user and the location information of each advertiser in the places server 208. When a match is detected, the content of each advertiser can be added to the web place or web site that is created for the marked location.

The floating profile 204 allows data transfer between the mobile terminal 202 and the places server 208 to be minimized. In one embodiment, the modifications to the floating profile 204 will contain only a delta of the modified data between versions. This data can be sent in a compressed format to further minimize traffic requirements. The floating profile 204 will also queue all concurrent modifications before sending the modified data. The queued modifications can then be bundled and sent simultaneously. This can minimize the number of actual synchronization times.

In one embodiment, data synchronization with the floating profile 204 can be encapsulated in an HTTP connection. An HTTP connection allows the data to pass through firewalls and other internet devices, providing better connectivity and quality.

In a situation where the terminal resident profile and the community resident profile have been modified simultaneously, a conflict can occur. In one embodiment, the floating profile 204 (server) will automatically execute a profile merge between the two versions, item by item. The merged profile can then be sent back to the mobile terminal 202. In the situation where the same data fields inside the same single object are modified, on both the terminal resident profile and the community resident profile, the floating profile 204 (server) can apply an opportunistic lossless merge based on object timestamps, where the latter modification applies. In one embodiment, the floating profile 204 (server) can resolve the merge transparently and without user interaction. In alternate embodiments, any suitable conflict resolution process can be applied.

It should be noted that other applications can also use the dll unless it is specifically prevented. If needed, third party applications can be blocked from using it by checking vendor identification of the using process.

Configuration information for the component is given from outside in form of a Symbian resource structure. Configurable data includes URLs for the places server 208 and the forms needed to authenticate, commit profile etc.

In one embodiment the downloaded KML files are stored in a subfolder of the private folder of the application, using for example, the floating places engine. For each separate user an "own" subfolder named after the subscriber identity is used. User credentials can be stored in a separate file in the same directory, together with a password in encrypted form. Using the application's "private" folder makes the file storage secure by default. Symbian platform security prevents unauthorized applications from accessing the files. In alternate embodiments, any suitable secure file storage facility or system can be utilised.

The compressed KML file is decompressed to a temporary file before parsing the data. The file is stored directly in the application's private folder and named with the subscriber identity as the extension. The drive to be used can be configured in the resources utility of the application or device. By default, in one embodiment, the C drive will be used for both KML and temporary files. If the space taken by the uncompressed KML exceeds pre-determined or desirable limits, a memory card or other storage facility can be used as well.

In one embodiment, to prevent separate users from accessing other people's profiles, user identification is made by querying the SIM serial number. When the SIM card is changed, the floating profile of the previous user is not shown to the latter, so he/she has to create or download his/her own profile. When the identity changes, the cached KML files are left in the phone to be available for the next user, but any earlier temporary files are removed to save space.

A KML parser supporting only the required tags can be used, using the default Symbian XML SAX parser as a basis. In alternate embodiments a completely custom-made parser can be used that is more efficient and flexible for this limited purpose.

As the KML file is parsed, a run time DOM model is generated. In the first phase of implementation all data is stored in DOM. As the count of POIs can become very high, memory consumption will eventually grow to unacceptable levels. Therefore, only a minimal set of information from the tags is stored in the model at first, the rest is retrieved on-demand from the file.

The policy of storing runtime data in memory is largely defined by the user interface specification, which defines what information is needed to be shown at a "top" level of the user interface. The detailed information can be retrieved in advance based on the current context before actually used, and is available with minimal delays. This on-demand loading with other more sophisticated features requires a custom KML parser to be developed.

In one embodiment, the mobile terminal 202 authenticates itself with NCIM credentials to the places server 208 using basic access authentication as defined by RFC 1945 or XXX, for example. In alternate embodiments, any suitable authentication processes can be used. The places server 208 functions as authentication proxy for the NCIM web authentication and user credential management service.

All authentication requests can be encrypted, using for example, transport layer security (TLS) (HTTPS). In alternate embodiments, any suitable encryption scheme or cryptographic protocol can be utilized. The authorized state of a particular client will be maintained using a session, which will require the client to save a cookie on the first authorization request and to keep it for the rest of the corresponding client-server communication session. Each action, such as authentication, profile update, etc., will have its own URL, that the application is aware of.

In one embodiment, the mobile terminal 202 may use the update floating profile functionality to download a newer version of the floating profile 204 from the places server 208. In one embodiment, the following pre-conditions can apply:
The user is successfully authenticated;
The mobile terminal 202 has NOT made any changes to the floating profile 204.
The update is done using a protocol as follows:
The mobile terminal 202 makes a HTTP-request to the places server 208 with protocol versioning;
The places server returns a hash value of the current Floating Profile version;
The mobile terminal 202 compares the hash value to its current Floating Profile;
If hash value has changed, the mobile terminal 202 pulls a new version of Floating Profile from the places server.

The MCU Tag List is a compressed file or text index that contains 1000 most used service tag names for POI's. This index is used by "Add Tag" UI control as source of predicting text feed for tags. The MCU Tag List is language specific. The file may be updated over the network by the places service.

The mobile terminal 202 may use the Update Tag List functionality to download a newer version of the MCU Tag List from the places server 208. The following pre-conditions can apply:
The mobile terminal 202 has NOT updated the MCU Tag List recently (e.g. for 30 days).
The update is done using the following protocol:
The mobile terminal 202 makes the HTTP-request to the places server 208 with protocol version and language code.
The mobile terminal 202 pulls a new version of MCU Tag List from places server 208.

The mobile terminal 202 may use Commit Floating Profile functionality to upload a newer version of the Floating Profile to the places server 208. The following pre-conditions can apply:
User is successfully authenticated;
The mobile terminal 202 has made changes to Floating Profile.
The commit is done using the following protocol:
The mobile terminal 202 makes a HTTP-request to the places server 208 with a timestamp.
The places server 208 returns the value of current Floating Profile timestamp.
The mobile terminal 202 compares the received timestamp to its current Floating Profile.
If timestamp has changed, the mobile terminal 202 pushes a new version of Floating Profile to the place server 208
The mobile terminal 202 performs Update Floating Profile in case the server 208 has performed a profile merge.

The KML Queue is a data storage in the mobile terminal 202 that contains pending KML and XML objects. Each time a user posts a tag, review or event, this is stored KML Queue. The pending objects in the database (if any) are sent to the places server 208 during normal floating profile synchronization.

The mobile terminal 202 may use Commit KML Queue functionality to upload pending tags, reviews and events to the places server 208. The following pre-conditions can apply:
User is successfully authenticated.
The mobile terminal 202 has pending objects in KML Queue.
The commit is done using the following protocol:
The mobile terminal 202 pushes the pending XML objects to the places server 208 via HTTP protocol. All KLM Queue objects should contain a language code and time zone information for future use.

In one embodiment, the NCIM 210, also known as the Security Assertion Markup Language (SAML/WEBSSO) interface, provides a mechanism to authenticate, implement single login and logout for consumers using Web browser and provide information of the consumer to the service provider. This interface is documented in NCOM—SAML/WEBSSO—Interface Specification, the disclosure of which is incorporated herein by reference in its entirety. In one embodiment, a single profile and account is provided for all interactions. This provides for a single sign-on to the floating profile 204 and places server 208.

Figure 3:
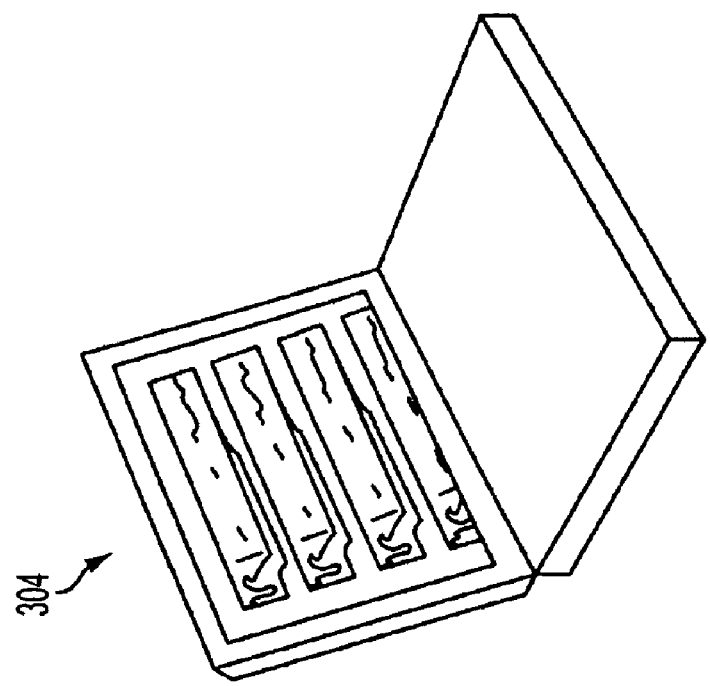
FIG. 3 is a block diagram of one example of a system incorporating aspects of the disclosed embodiments.
Figure 3:
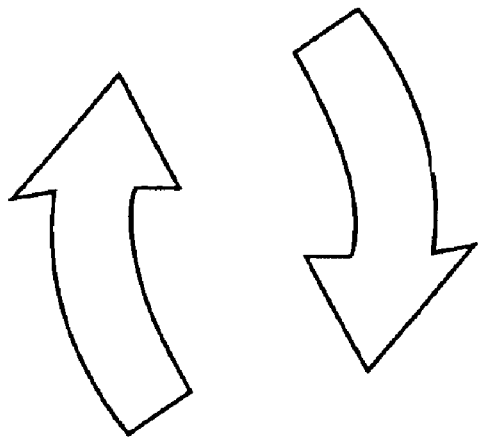
Figure 3:
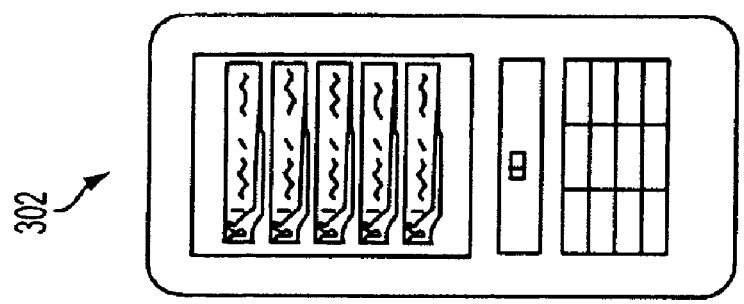

FIG. 3 illustrates one example of a use case including aspects of the disclosed embodiments. In one aspect, the disclosed embodiments provide a single service with two windows, where location data and content is synchronized between the user mobile device 302 and the desktop device 304. The windows, or user interface, to the location-based service of the disclosed embodiments will include the user's mobile device 302 browser and a desktop browser on the computing or desktop device 304.

The mobile terminal 302 is used to capture a desired location. In this example, "capture" refers to marking the geographic location using the terminal 302. This can involve setting a position mark or capturing an image in conjunction with the position mark. In one embodiment, each marked location is assigned a Universal or Unique Place identifier ("UPI"). This allows each location that is marked to be uniquely identified and easily searched for and located within the places website. The position mark or location is uploaded to the places server 208 where a location page is created or information on the location or place is retrieved. The user can seek to create a new location web page or seek guidance or information from an existing web page. In another aspect, the user can make use of the online world using device 304 to retrieve information on places already stored in the system as well as share information. For example, in one embodiment, the locations or places are "pre-seeded". The user can look up a location and obtain information related to the location. With pre-seeded locations, the user interfaces are pre-defined and content related to the place is added. Thus, when a user marks a location, information and content related to the location is automatically retrieved and returned to the user.

In one embodiment, a guidance mode of the mobile terminal 302 allows the user to select or mark a site as a geographical location. Once the location is marked, the user can connect to the places server 208 of FIG. 2 and request data and information on the location. If a web page has not previously been established for the location, the user can select to create a new page for the location. Once the page is created, the user can add content to the web page from the mobile terminal, for example. The content can be synchronized with the user's profile from the floating profile 204 that is resident in the places server 208. The user can also choose to publish the content in community pages.

In one embodiment the user can utilize the online window of device 304 to access information about places and download or synchronize this information with the mobile device 302. For example, a user wishes to plan a trip or visit. In one embodiment, the user utilizes a desktop browser of device 304 to access the places server 208. The user can find new places on the places web server using the desktop browser of device 304 and send them to the mobile terminal 302. Depending on the content stored in the places server 208, the user may be able to view information about places to visit, hotels, restaurants and transportation, for example. This information can be saved locally and also sent to the user's mobile terminal 304.

In one embodiment, the mobile terminal 302 can be used to locate places of interest. The user interface of the mobile terminal 302 will generally be the same or consistent with the user interface of the device 304, so that features can be viewed and accessed in similar fashions.

Figure 4:
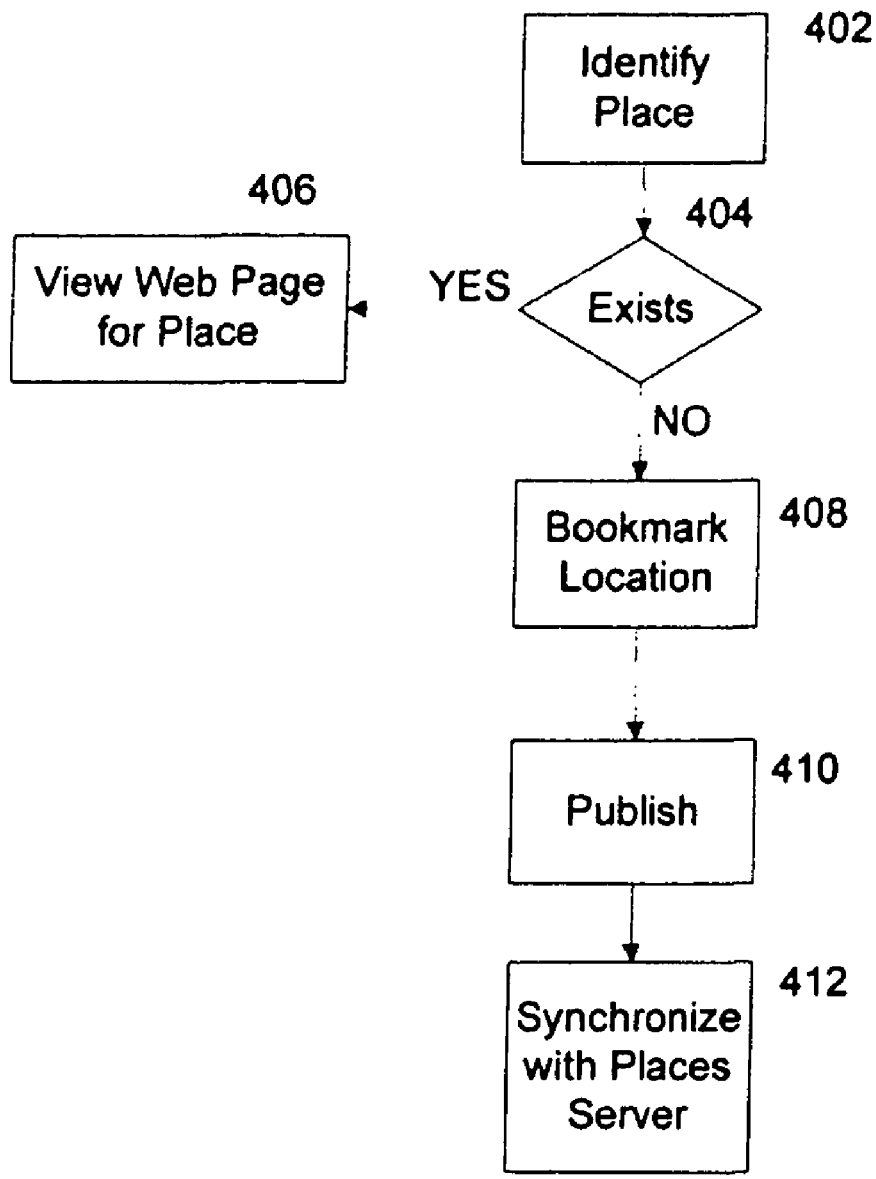
FIG. 4 is one example of a process flow incorporating aspects of the disclosed embodiments.

One example of a method incorporating aspects of the disclosed embodiments is illustrated with respect to FIG. 4. A user identifies 402 a place of interest and initiates a query 404 to determine whether the place has a web page in the places server 208 of FIG. 2 associated with it. If the web page does exist, the content associated with the web page can be requested from the associated server and the page delivered or rendered 406 to the mobile terminal. In one embodiment, identifying 402 the location means the user marks the location and opens a browser on the device. The browser opens to the places website and renders the page corresponding to the site of the marked location. If a web page for the location does not exist, the location can be bookmarked 408 and a web page created through predefined interfaces. Information related to the location is then published for others to view. The data relating to the location in the mobile device is synchronized 412 with the places server 208.

The disclosed embodiments can also provide for accessing an outside service to retrieve images related to a location. For example, in one embodiment, a user marks a place of interest. A request is transmitted, using for example the mobile terminal 202, to the places server 208. The places server 208 can then request or retrieve associated images or multi-media content from an online service provider, such as for example Twango™ or Flicker™. This can allow the user to browse and see images related to the location. The places server 208 can also request and render content related to the place of interest from other $3^{rd}$ party content providers.

If a URL does not exist, meaning a web page for the location has not been created, the user can bookmark the location. In one embodiment bookmarking the location can include adding landmarks or favorites into the floating profile that are resident in the mobile terminal. The URL is generated and the location domain is updated. This can be done whether or not the mobile terminal is connected to the internet at the time. For example, referring to FIG. 4, the user can publish 410 the location data and any associated content, which can later be synchronized 412 with the user's profile resident in the places server.

In one embodiment when the URL for a place does not exist, an interface to a communities application in the map server 206 of FIG. 2 can be activated. Information can be collected from the communities application that is related to the location. In one embodiment, the information will have a URL address that is associated with the place of interest. The information can be collected and posted to the web page that is created for the place of interest. Other content, such as third-party content or branded content, can be searched for and posted to the web page if a match is detected. Branded content can include advertisements, which can allow for advertisement opportunities according to conventions of media sellers with respect to newly marked and created "places" web pages. Thus, as a page such as that shown with respect to FIG. 9 is created, content can be seeded and unified to develop the page.

In one embodiment, the user can create tags, reviews or events that can be stored in the mobile terminal and then posted to the mobile during the next data upload or synchronization. The places server 208 is configured to be able to host thousands of reviews for a single object, which are not mobile terminal resident. In one embodiment, reviews and other user generated content are only stored on the places server 208 of FIG. 2. In alternate embodiments, the user generated content can be stored in any suitable location or facility. A mobile-oriented light HTML section of the places web-site can also be stored on the server. If an identification of an object is provided, the user can browse reviews submitted by others. An application on the mobile terminal will launch a web-browser providing the URL of the web-site section and pass the object ID parameter to it in order to see the reviews.

The aspects of the disclosed embodiments can also allow a user to create and generates routes that include points of interest. A user can create a route and then also publish the route to the places server 208 so that others can view the route, and any comments thereto.

In one embodiment, a user can mark a general location with a device, such as a mobile communication device. Alternatively, the information related to the marked location can be transmitted to or uploaded to the device. As the user nears or is at the location, a notification can be provided to the user to indicate their proximity to the location. In one embodiment, the notification can be in the form of a text message or email to the device. The location of the user can be monitored in any suitable manner.

The aspects of the disclosed embodiments also provide for a common user interface when accessing the places server 208 of FIG. 2, whether it be via the mobile terminal 302 of FIG. 3 or the desktop browser of device 304. It is a feature of the disclosed embodiment that places on the web or on the mobile can be accessed from a single intuitive user interface.

Figure 5A:
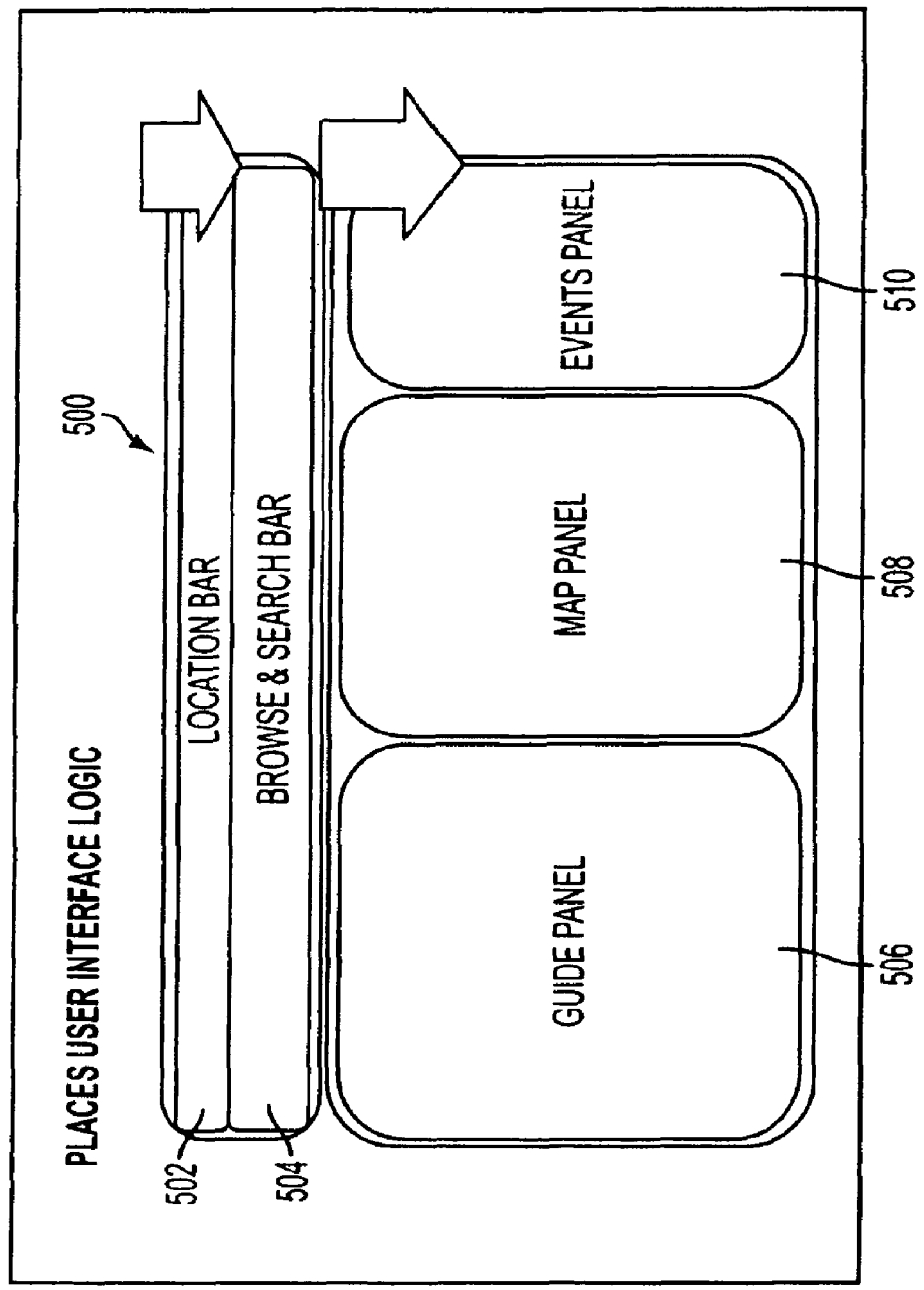
FIGS. 5A-5E are examples of user interfaces that incorporate aspects of the disclosed embodiments.

One example of such a user interface is shown in FIG. 5A. As shown in FIG. 5A, the user interface 500 generally comprises a location bar 502, a browse and search bar 504, a guide panel 506, a map panel 508 and an events panel 510. These elements are generally exemplary and are not intended to encompass all elements that might be included in the user interface of the disclosed embodiments. In one embodiment, the bars or regions are expandable and may be changed in size, shape and configuration, depending upon the desired panel configuration.

The location bar 502 will generally provide the user with the ability to select and search information by location. Locations can include for example, countries, cities and districts that the user can select and search. The browse and search bar 504 will generally allow the user to select, search and obtain further levels of detail and information on places of interest with respect to item(s) selected on the location bar 502.

Figure 5B:
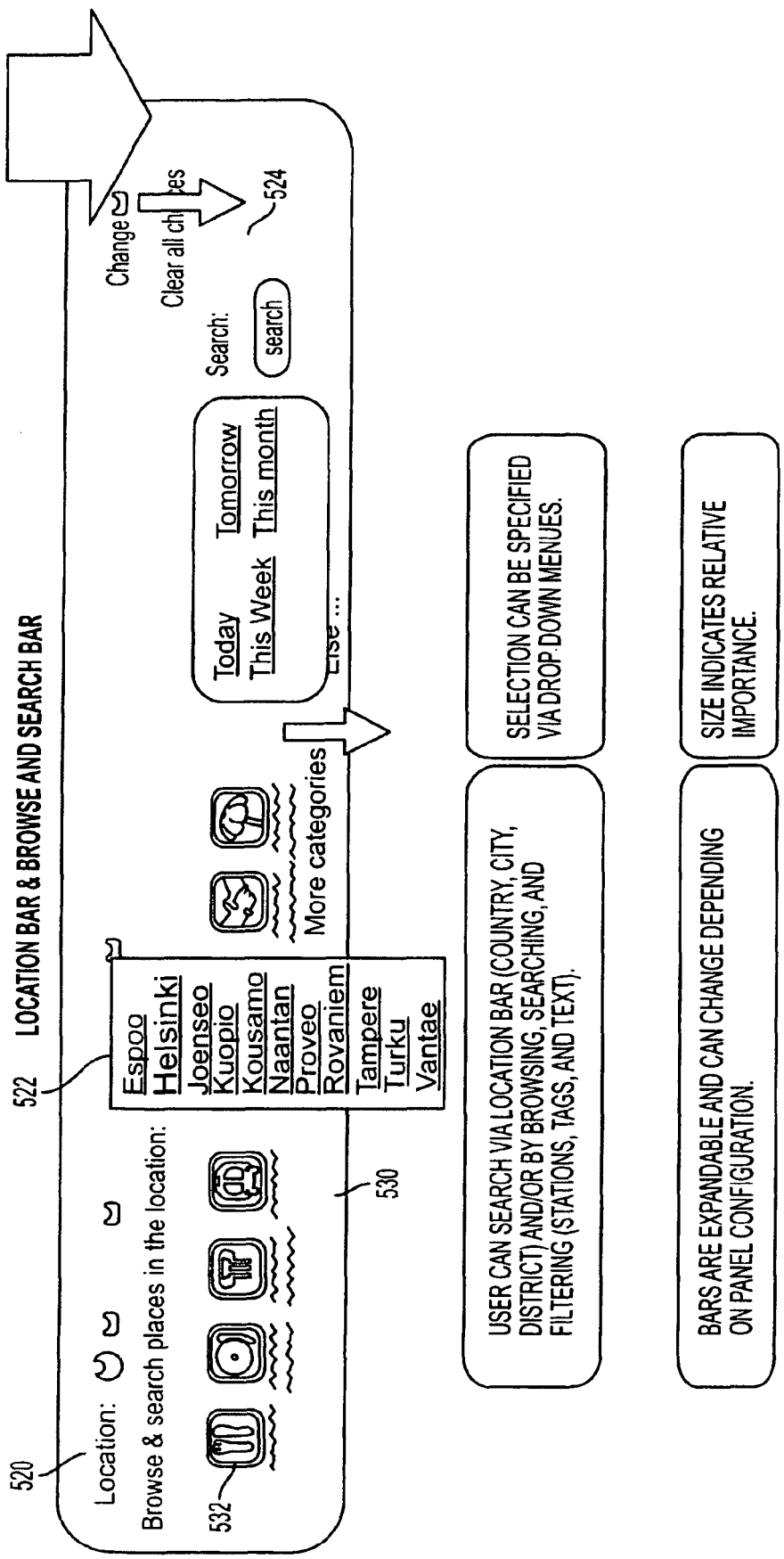

FIG. 5B illustrates one example of a location bar 520 and browse and search bar 530. As shown in FIG. 5B, the location bar region 520 includes selection options related to different geographic locations. The locations range from broad criteria, such as "Europe" to more narrower criteria, such as "Helsinki". In this manner the user can adapt the scope of a search. In this example the location options include Europe, Finland and Helsinki. In one embodiment a selection of one of the items in the location bar can provide a drop down menu 522, that can include one or more related locations. The drop down menu 522 can provide further levels of detail or granularity, or alternatives, related to the selected location item. Thus, when a user makes a selection of one of the objects in the location bar 520, additional levels of related subject matter will appear in a drop down style menu. For example, the user selects the "Helsinki" city option. A drop down list 522 of other cities is presented. The main city that is presented in the location bar 520 can be highlighted to appear in a more significant fashion relative to the other list items. In this example, the word "Helsinki" is made to appear larger relative to the other city names in the list 522 to indicate it is the selected menu item. In alternate embodiments, the option for selection of an additional menu item can be presented via any suitable indication.

In one embodiment, the items in the list 522 can be highlighted to indicate some level of significance relative to the other items on the list. In the example shown in FIG. 5B, the size of the text of each entry is suggestive of the relative importance of the entry. In alternate embodiments any suitable indicator can be used to indicate importance, including for example, highlighting or bolding of the text or entry. The location bar 520 can also be configured to allow searching by browsing, searching and filtering (stations, tags and text). A search field 524 can be provided to allow for free form searching. The location bar 520 allows the user to initiate a search via the location bar.

The browse and search bar or region 530 allows the user to be able to select and obtain information on places or areas of interest related to the selected location. Different icons, such as icon 532 can be provided that when selected, provide information or links to information on the selected subject of interest. Thus, icon 532, being related to "Eat & Drink" can provide a menu of such establishments. The menu could be a drop down menu as in 522, with more significant or closer establishments being highlighted.

Figure 5C:
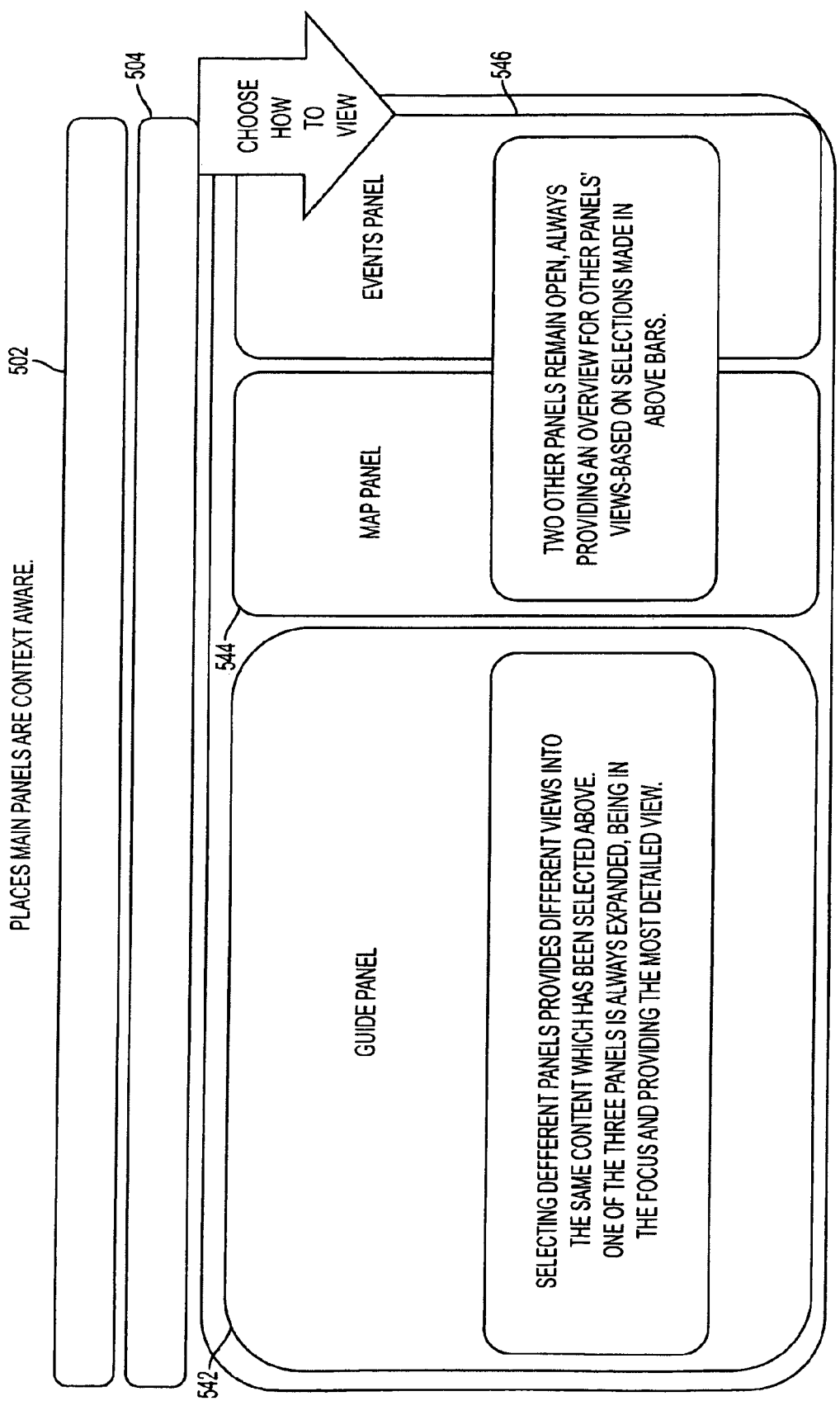
Figure 5D:
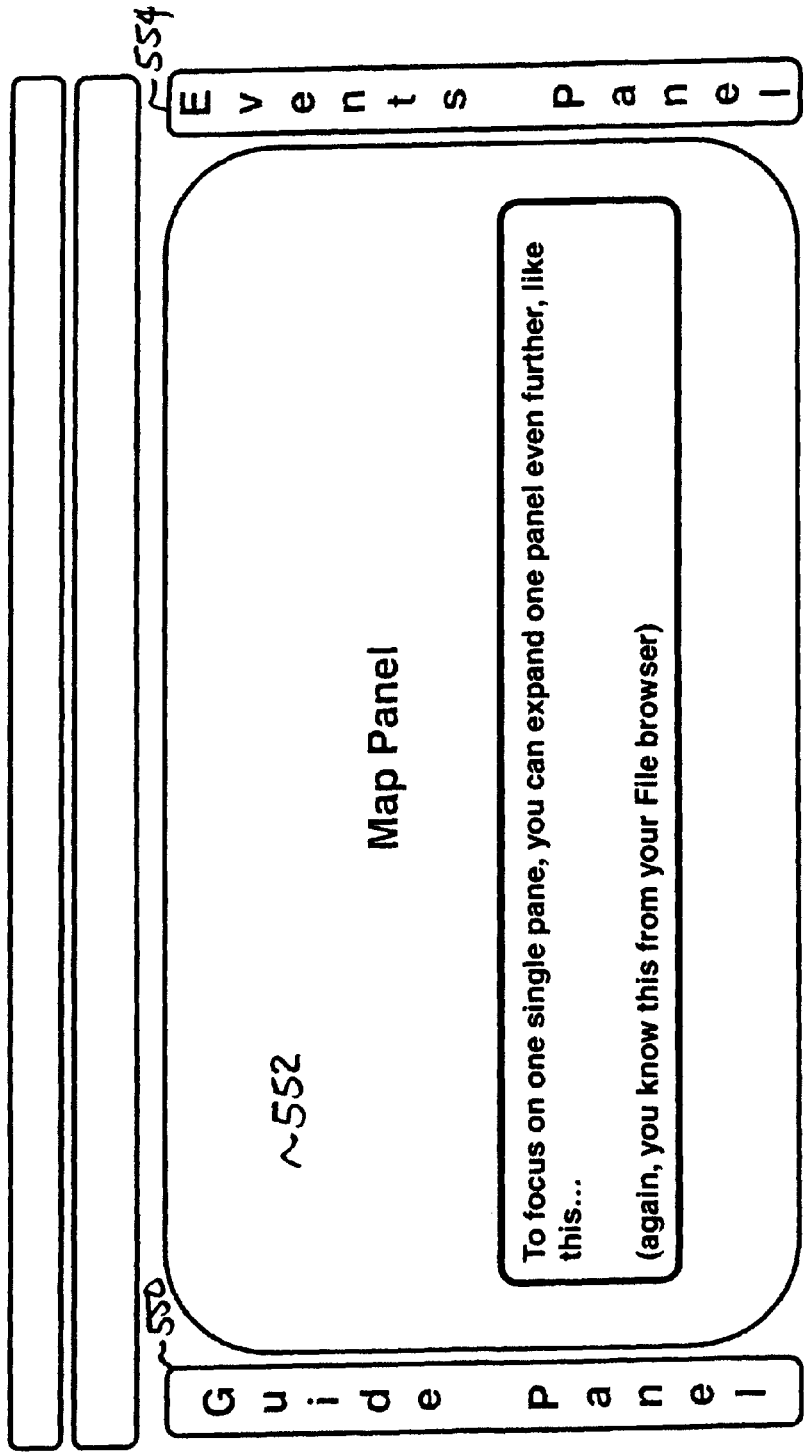

In one embodiment, the panels 502, 504, 506, 508 and 510 of FIG. 5A are context sensitive. For example, referring to FIG. 5C, selecting different panels provides different views into the same content. When a panel is selected, such as Guide Panel 542, the panel can automatically expand to show more views and details into the content. The other panels, while remaining open or visible, can be correspondingly or proportionately reduced in size. By remaining open, the other panels, in a reduced configuration, can provide an overview to the underlying views. As shown in FIG. 5C, the guide panel 542 is selected. The guide panel 542 is expanded in size while panels 544 and 546 are reduced in size. FIG. 5D illustrates an example where the selected panel, in this case map panel 552 is expanded. The guide panel 550 and events panel 554 are still present, although reduced relative to the map panel 552. This allows the user to focus on a single panel, but still maintain a quick view to the other panels.

The information displayed in the guide panel 542 will generally relate to the selections made from the bars 502 and 504. For example, referring to FIG. 5B, the user selects "Helsinki" in bar 520. Then the user selects the "eat & drink" icon 532 in bar 530. The guide panel 542 of FIG. 5C will then display or present information corresponding to the "eat & drink" selection with reference to locations in Helsinki. This information can include links to eating and drinking establishments as shown in E10 of FIG. 5E.

Figure 5E:
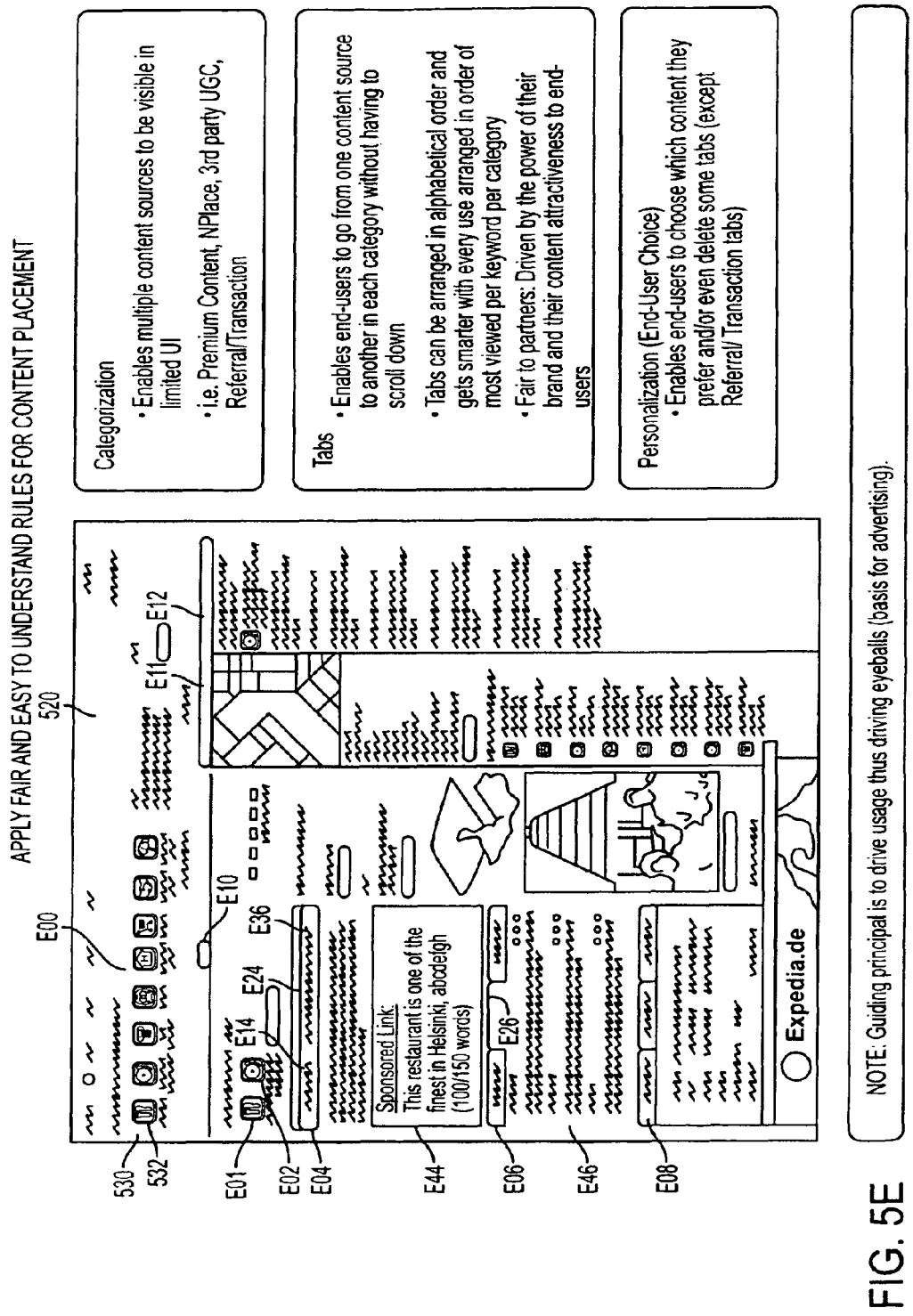

In one embodiment, initially or when selected, one of the three panels is expanded, being in focus and providing the most detailed view. The other two panels remain open, always providing an overview to the other panel's views, based at least in part on the selections made in bars 502 and 504. This enables multiple content sources to be visible in a limited user interface. The panels generally provide for categorization of the information. As shown in FIG. 5E, the panels can also include categorization of content sources and information within the panel. The different categories can be identified by tabs, such as tab E14. This type of categorization allows the end user to go from one content source to another in each category without having to scroll. The tabs can be arranged in any suitable manner.

With reference to FIG. 5E, the user selects a location from the location bar 520 and then the area of interest from bar 530. Corresponding links are presented in the Guide panel E10, Map panel E11 and Events panel E12. In this example, the user has selected the "Eat & Drink" object 532. The Guide panel E10 presents links to eating and drinking establishments corresponding to the selected location(s). The map panel E11 presents map and location information related to eating and drinking establishments. The events panel E12 will present eating and drinking event related information. The aspects of the disclosed embodiments allow for multiple content sources to be visible in a limited user interface. The different content sources can be viewed without the need to scroll through different menus and categories. More detailed information can be presented under tabs, such as tabs E06 and E08.

As shown in FIG. 5E, in the guide panel E10, the tabs allow a user to go from one content source to another in each category without having to scroll down. For example, in the guide panel E10, tabs E14, E24 and E34 provide content related to different types of eating and drinking establishments, when the "eat & drink" icon 532 is selected above. As shown in FIG. 5E, the selected object 532 is represented in the guide panel E10 as object E01. This allows the user to identify the particular selection. In this example, the user has also selected the "Going Out and Entertainment" category icon, which is redisplayed in the guide panel E10 as object E02. Sponsored link, such as link E44, may have an individual space or tab. The tabs can be presented in any suitable order. In one embodiment, the tabs can be arranged in alphabetical order. In an alternative embodiment, the tabs can be arranged in a "smart" manner, where the tabs are rearranged or preferably displayed with each use to present the most used or viewed categories, which can also be determined by keyword use. Content partners can be granted more preferable positions. Advertisers may be able to purchase real estate on the user interface for display if advertising information in the different categories and panels. In one embodiment, the user can choose or pre-select the types of content and categories that are to be presented.

The aspects of the disclosed embodiments can also provide for advertising, and in particular targeted advertising related to places. For example, in one embodiment, a user marks a location with a device. When the device browser is opened and connects with the places server 208 of FIG. 2, a check can be made to determine if there are any advertisements related to the particular site. In one embodiment, the related advertisements can be connected and located by the universal place identifier.

In one embodiment, users can provide feedback related to locations and related advertisers. For example, if a user takes advantage of an advertisement, such as by patronizing the advertiser, the user can then provide feedback that will be posted in connection with the marked location and advertisement. The feedback can be positive or negative, or any suitable comments. In one embodiment, if positive reviews and comments are received, the advertisement can be automatically repositioned, reformatted or resized, relative to its current display on the website, so as to attract more attention. Similarly, an advertisement that receives negative reviews can be diminished so as to focus less attention on the advertisement or content. In one embodiment, the places server 208 can include a ranking module that monitors reviews and rankings, and controls the placement and size of advertising and content on the site. In alternate embodiments, a ranking module can be a separate plug-in to the system 200.

The aspects of the disclosed embodiments provide for content placement on the user interface in a manner that provides for multiple content sources to be visible in a limited user interface. Referring to FIG. 5E, in one embodiment, content is categorized, with each category E04, E06, E08 of content area being displayed in respective areas on the user interface. The categories E02, E04, E06 are generally related to the icons E00 in the browse and search bar 530 of FIG. 5. When one or more of the icons E00 in the browse and search bar 530 are selected or activated, one or more corresponding content category regions can be displayed on the user interface. In the example shown in FIG. 5E, the icons E01 and E02 have been selected from the browse and search bar 530. In one embodiment, the selected icons E01 and E02 can be re-presented or displayed in the guide region E10 of the user interface. Although three content category regions are shown in FIG. 5E, E04, E06 and E08, in alternate embodiments, any suitable number of content regions can be displayed. It is a feature of the disclosed embodiments to make or enable multiple content sources to be visible, even when there is limited display area on the user interface of the corresponding device.

In one embodiment, the content corresponding to each category region E04-E08 is accessible via an activatable tab associated with each content area. For example, in FIG. 5E, category E04 relates to establishments. In category E04, three tabs are provided, E14, E24 and E34, each corresponding to establishment content area, such as restaurants or eating guides. When a tab is selected, the content area is made available to the user. Although only three tabs are shown in the category E04 of FIG. 5E, in alternate embodiments any suitable number of tabs can be provided. It is a feature of the disclosed embodiments to enable users to go from one content source to another without the need to scroll down. The tabs can be positioned in a fashion to be easily perceptible to the user. The arrangement or order of the tabs can be in any suitable fashion, such as alphabetical for example. In one embodiment, tabs, or other suitable selection mechanism, can be presented in an order that corresponds to past use or estimation based upon the user's preferences. For example, in every use, tabs can be arranged in an order based on most viewed, keyword or category. In alternate embodiments, the tabs can be arranged in any suitable fashion.

When a tab is selected, content E46 related to the selected content area E26 is made available to the user. The user can browse the content E46 in the content area E26 in any suitable fashion, such as for example, scrolling a list. In order to view additional information related to a specific content item in the list of content E46, the user can select a specific content item in any suitable fashion.

In one embodiment, certain content can be presented in a more noticeable fashion relative to other content on the same page. For example, as shown in FIG. 5E, the content area E44 associated with the category E04 is presented in a fashion to be more noticeable to the user. In this example, the content area E44 is larger than other content areas and includes a link to a sponsor and descriptive content. In alternate embodiments, the content area E44 can be distinguished in any suitable fashion and provide any desired content. In one embodiment, the content of area E44 might be related to a content category that is based on sites most visited or keywords most used, or driven to a content sponsor.

In one embodiment, the user can customize the content that is presented. For example, a user can pre-set the types and sources of content that are presented in different category areas. The user can also choose content they prefer as well as delete tabs corresponding to content that is not desired or not of interest.

Figure 5F:
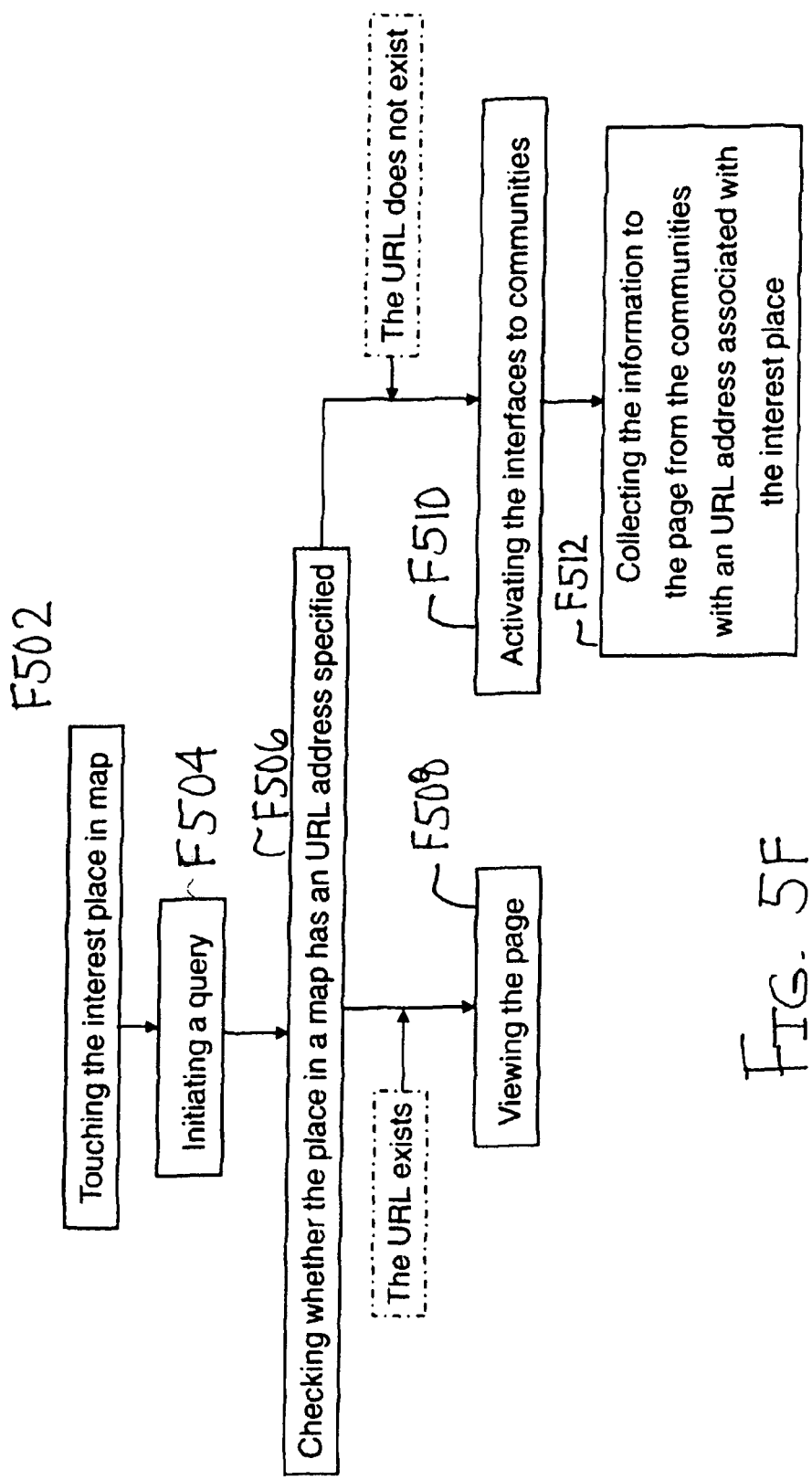
FIGS. 5F-5G are examples of processes that incorporate aspects of the disclosed embodiments.

Referring to FIG. 5F, a process incorporating features of the disclosed embodiments is illustrated. In this example, a user of a device, such as a mobile communication device, has captured F502 a location. This can include marking the geographical coordinates with a suitable function in the device. In one embodiment, a user may have a map application active on the device, and mark the location directly on the map. Generally, it is not required to mark an exact location, as the aspects of the disclosed embodiments allow a location to marked or pinpointed within a certain tolerance or range. Once the location is marked, the user may initiate a query F504 for information on the marked location. In one embodiment, the query is automatically generated. As soon as the location is marked, and the device browser connects with the places server, and the query is generated. In one embodiment, the query can be user initiated. When the location is marked, the user can be prompted to initiate a query or can select to initiate the query for information on the marked location.

Once the device connects with the places server, the location information is transmitted and a check F506 is made to determine whether a URL address or webpage for the marked location has previously been established. In accordance with the disclosed embodiments, each location or place will have a unique URL or web page.

If the URL exists, the web page will be rendered to the device and the user will be able to view F508 the page and the content associated therewith. If the web page does not exist, the page will need to be created. In one embodiment, an interface or link to a community site will be established F510. This can be a link to a site that includes information or content pertaining to the location. Information and data related to the marked location will be collected and a URL will be established F512 for the marked location.

Figure 5G:
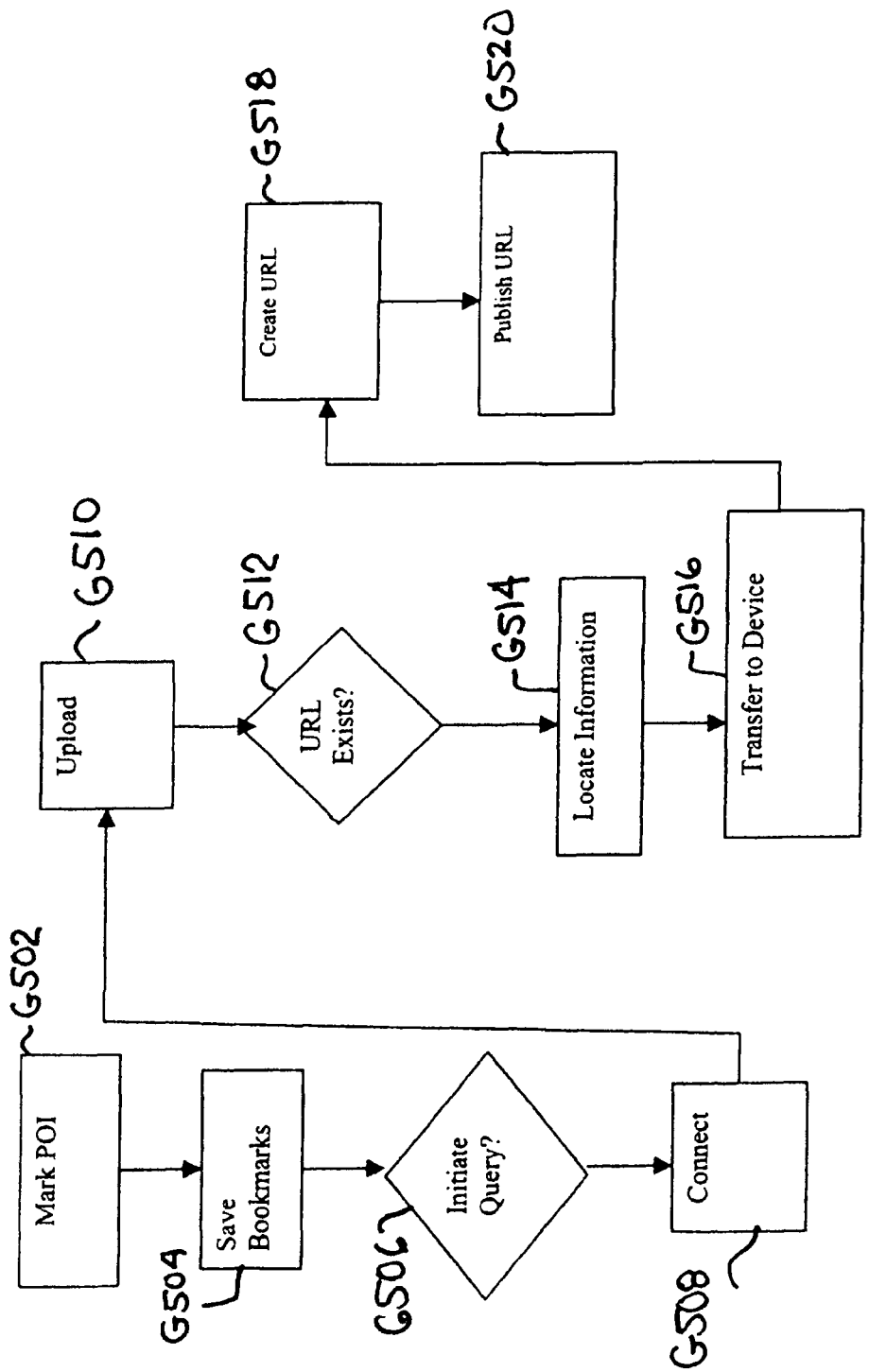

The aspects of the disclosed embodiments will also allow a user to mark locations along a route, store the marked locations, and later download the stored data and obtain further information on the locations and the route. For example, a user sees a point of interest, but does not wish to or have the time to visit the particular location. Referring to FIG. 5G, using the device, such as a GPS enabled mobile terminal, the user marks G502 the location. The marked location can be stored G504 as a bookmark in the device. In one embodiment, the user can store G504 any number of such bookmarks. If the user does not wish to immediately initiate G506 a query on the location, the user can select to defer such a request to the places server. When the user has bookmarked G504 all desired locations, the user can initiate G506 a query to the places server. The query G506 can be automatically or user generated. When a network connection G508 is established, the bookmarked information associated with the query can be transferred to the places server 208. In one embodiment, the floating profile engine 204 of FIG. 2 is used to establish the connection G508, login and transfer G510 the bookmarked location information to the Places Server 208. The Places Server 208 will determine G512 whether a URL exists for each of the bookmarked locations. If a URL does exist, the information can be retrieved and returned G516 to the user. In one embodiment, the information can be returned in the form of a route or trip that includes navigation, points of interest, and other relevant information related to the bookmarked locations. The user can have the opportunity to publish the route or trip information for others to link to via the places server 208. For example, in one embodiment, the routing information can be linked to a specific location as "other points of interest" that can or might be visited. This will allow others to take advantage of the community aspects of the location and places server.

If a URL for one or more of the locations has not been established, the user will have an opportunity to create G518 a URL and have the URL published G520 as described herein. The URL information can then be transferred G516 to the user in any one of the manners described herein.

Referring to FIG. 1, the system of the disclosed embodiments can generally include an input device 104, output device 106, process module 122, applications module 180, and storage/memory 182. The components described herein are merely exemplary and are not intended to encompass all components that can be included in the system 100. The input device 104 is configured to allow a user to input data and commands to the system or device 100. The output device 106 is configured to allow information and data to be presented to the user via a user interface of the device 100. The process module 122 is generally configured to execute the processes and methods of the disclosed embodiments. The application process controller 132 can be configured to interface with the applications module 180 and execute applications processes with respects to the other modules of the system 100. The communication module 134 is configured to allow the device to send communications and messages, such as text messages, chat messages and email. The communications module 134 is also configured to receive communications from other devices and systems.

The applications module 180 can include any one of a variety of applications that may be installed, configured or accessible by the device 100. In one embodiment, the system 100 comprises a mobile communication device. The mobile communication device can be Internet enabled. The input device 104 can also include a camera or such other image capturing system. The applications of the device may include, but are not limited to, data acquisition (e.g. image, video and sound) and multimedia players (e.g. video and music players). In alternate embodiments, the system 100 can include other suitable devices and applications for capturing and storing images and transferring the images to the places engine 137.

While the input device 104 and output device 106 are shown as separate devices, in one embodiment, the input device 104 and output device 106 can be combined and be part of, and form, the user interface 102. The user interface 102 can be used to display information pertaining to multimedia content as will be described below.

In one embodiment, the user interface of the disclosed embodiments can be implemented on or in a device that includes a touch screen display or a proximity screen device. In alternate embodiments, the aspects of the user interface disclosed herein could be embodied on any suitable device that will display information and allow the selection and activation of applications or system content. The terms "select" and "touch" are generally described herein with respect to a touch screen-display. However, in alternate embodiments, the terms are intended to encompass the required user action with respect to other input devices. For example, with respect to a proximity screen device, it is not necessary for the user to make direct contact in order to select an object or other information. Thus, the above noted terms are intended to encompass that a user only needs to be within the proximity of the device to carry out the desired function.

Similarly, the scope of the intended devices is not limited to single touch or contact devices. Multi-touch devices, where contact by one or more fingers or other pointing devices can navigate on and about the screen are also intended to be encompassed by the disclosed embodiments. Non-touch devices are also intended to be encompassed by the disclosed embodiments. Non-touch devices include, but are not limited to, devices without touch or proximity screens, where navigation on the display and menus of the various applications is performed through, for example, keys 110 of the system or through voice commands via voice recognition features of the system.

Figure 6A:
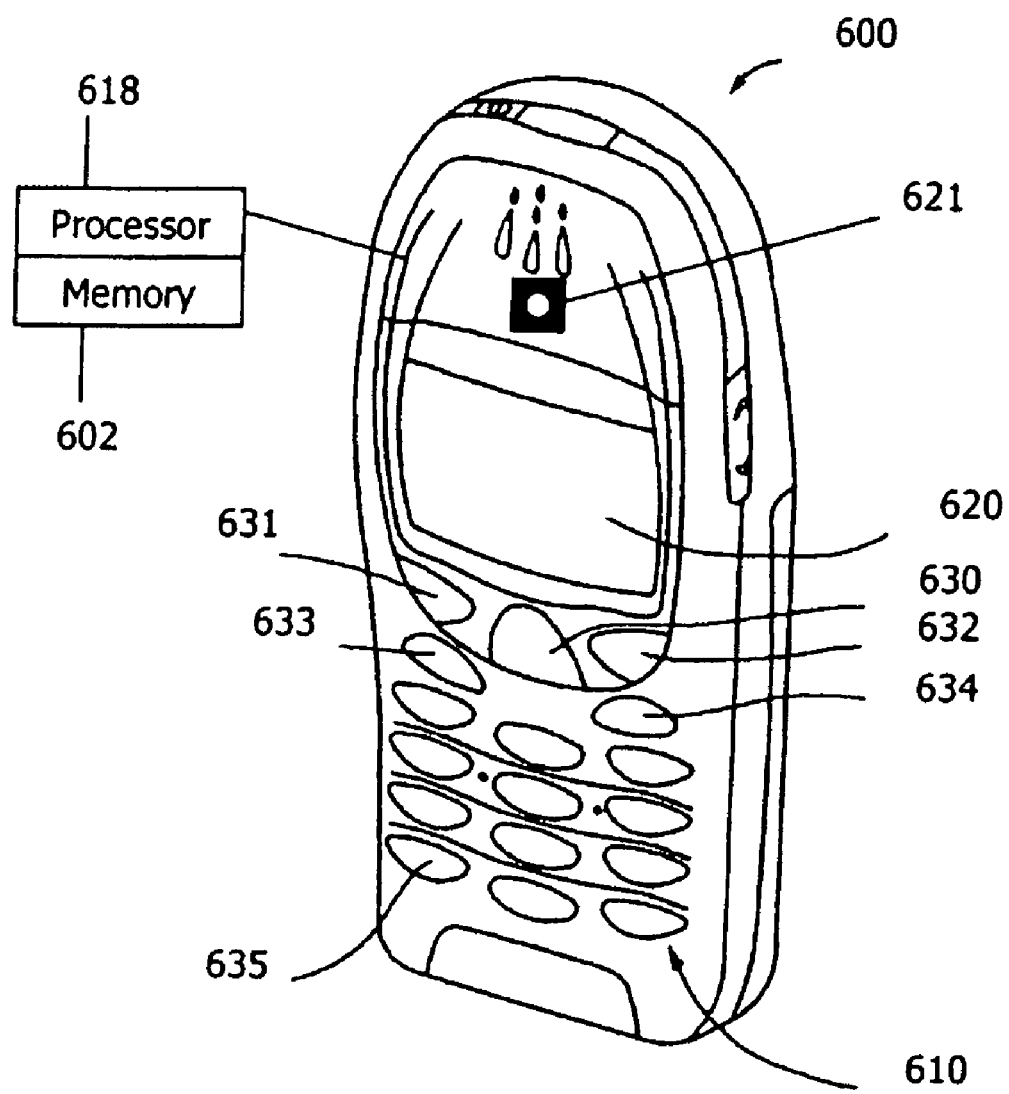
FIGS. 6A and 6B are illustrations of examples of devices that can be used to practice aspects of the disclosed embodiments.
Figure 6B:
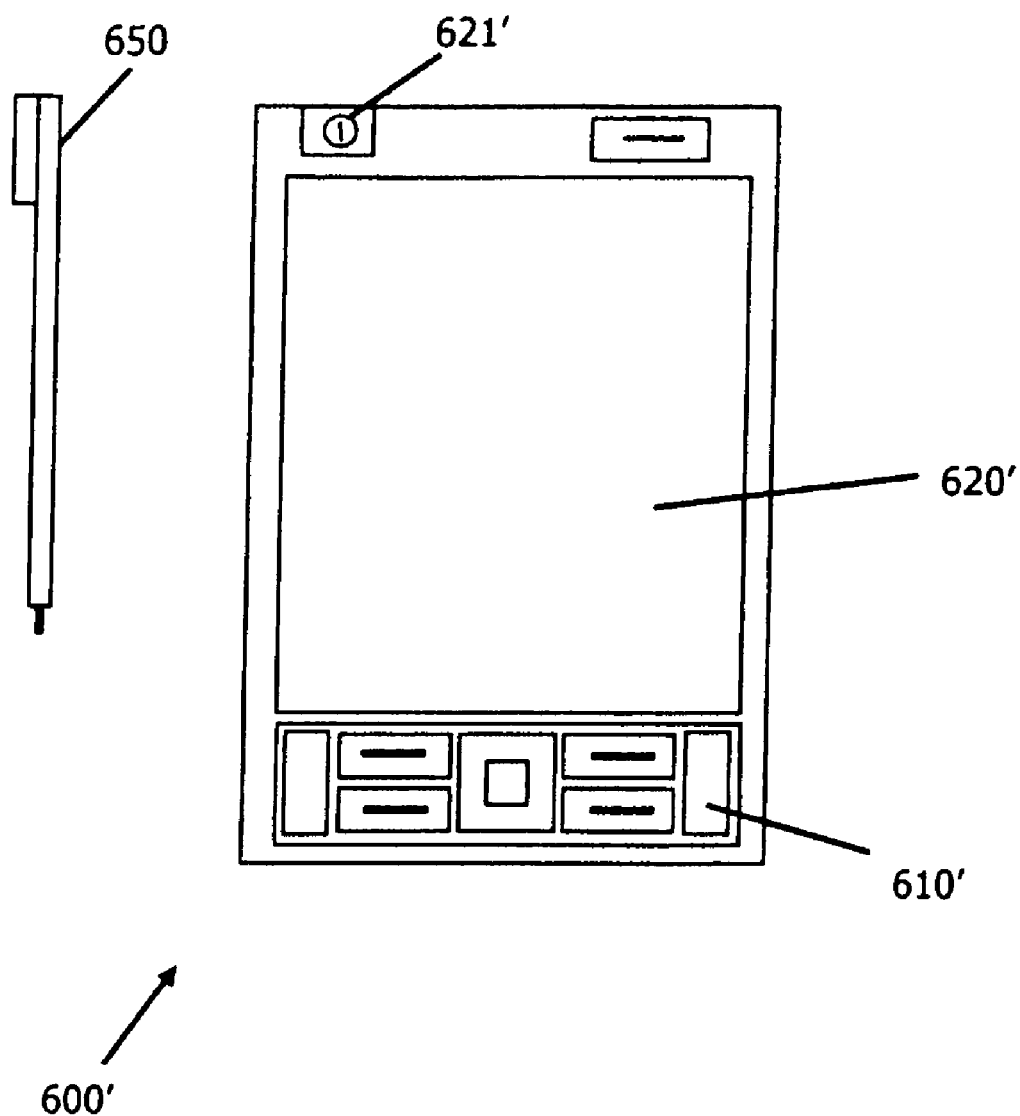

Some examples of devices on which aspects of the disclosed embodiments can be practiced are illustrated with respect to FIGS. 6A and 6B. The devices are merely exemplary and are not intended to encompass all possible devices or all aspects of devices on which the disclosed embodiments can be practiced. In one embodiment, the device comprises a GPS enabled mobile terminal, such as a GPS enabled smart phone. The Nokia™ N95 series of terminal is one such example. As shown in FIG. 6A, in one embodiment, the terminal or mobile communications device 600 may have a keypad 610 as an input device and a display 620 for an output device. The keypad 610 may include any suitable user input devices such as, for example, a multi-function/scroll key 630, soft keys 631, 632, a call key 633, an end call key 634 and alphanumeric keys 635. In one embodiment, the device 600 includes an image capture device such as a camera 621 as a further input device. The display 620 may be any suitable display, such as for example, a touch screen display or graphical user interface. The display may be integral to the device 600 or the display may be a peripheral display connected or coupled to the device 600. A pointing device, such as for example, a stylus, pen or simply the user's finger may be used in conjunction with the display 620 for menu selection and other input and commands. In alternate embodiments any suitable pointing or touch device may be used. In other alternate embodiments, the display may be a conventional display. The device 600 may also include other suitable features such as, for example a loud speaker, tactile feedback devices or connectivity port. The mobile communications device may have a processor 618 connected to the display for processing user inputs and displaying information on the display 620. A memory 602 may be connected to the processor 618 for storing any suitable information, data, settings and/or applications associated with the mobile communications device 600.

Figure 7:
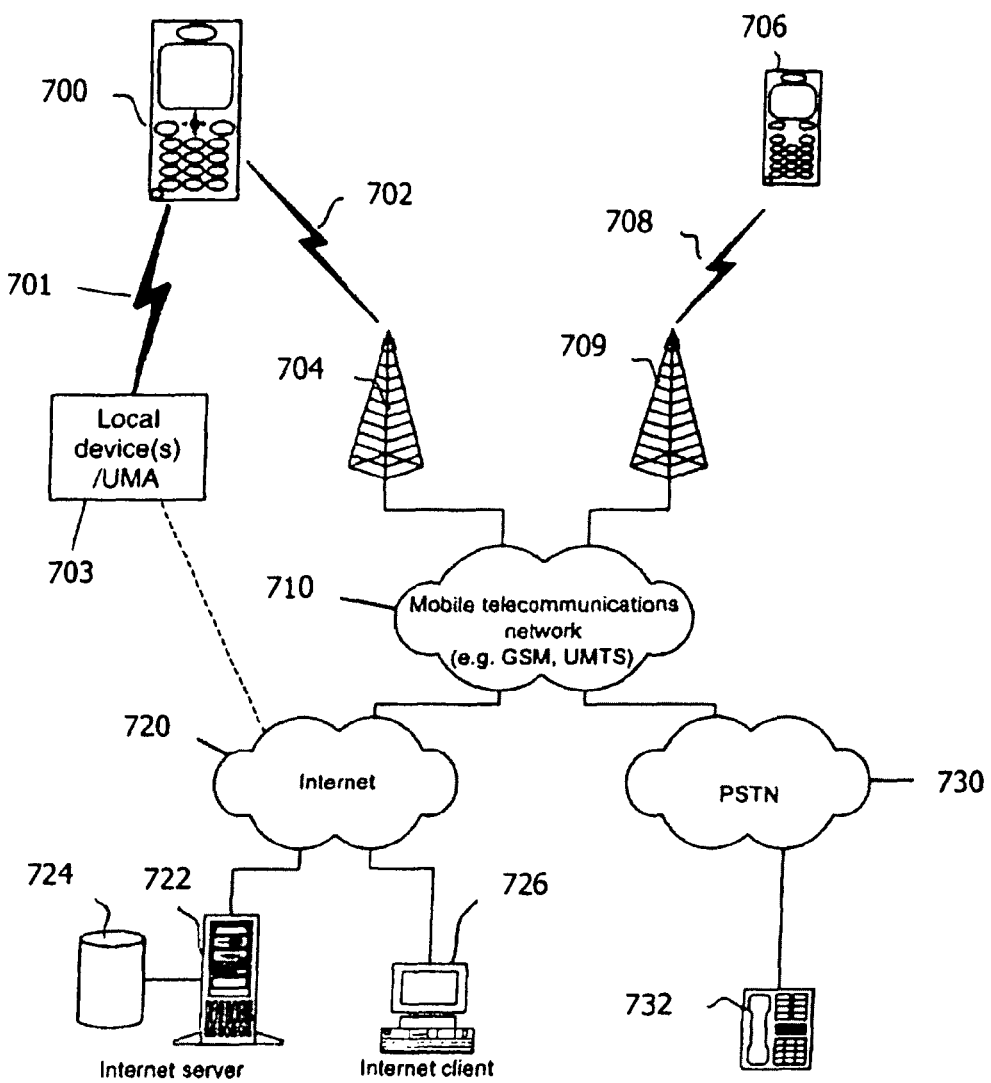
FIG. 7 illustrates a block diagram of an exemplary system incorporating features that may be used to practice aspects of the disclosed embodiments.

In the embodiment where the device 600 comprises a mobile communications device, the device can be adapted for communication in a telecommunication system, such as that shown in FIG. 7. In such a system, various telecommunications services such as cellular voice calls, worldwide web/wireless application protocol (www/wap) browsing, cellular video calls, data calls, facsimile transmissions, data transmissions, music transmissions, still image transmission, video transmissions, electronic message transmissions and electronic commerce may be performed between the mobile terminal 700 and other devices, such as another mobile terminal 706, a line telephone 732, a personal computer 751 and/or an internet server 122. In one embodiment the system is configured to enable any one or combination of chat messaging, instant messaging, text messaging and/or electronic mail. It is to be noted that for different embodiments of the mobile terminal 700 and in different situations, some of the telecommunications services indicated above may or may not be available. The aspects of the disclosed embodiments are not limited to any particular set of services in this respect.

The mobile terminals 700, 706 may be connected to a mobile telecommunications network 77 through radio frequency (RF) links 702, 708 via base stations 704, 709. The mobile telecommunications network 710 may be in compliance with any commercially available mobile telecommunications standard such as for example global system for mobile communications (GSM), universal mobile telecommunication system (UMTS), digital advanced mobile phone service (D-AMPS), code division multiple access 2000 (CDMA2000), wideband code division multiple access (WCDMA), wireless local area network (WLAN), freedom of mobile multimedia access (FOMA) and time division-synchronous code division multiple access (TD-SCDMA).

The mobile telecommunications network 710 may be operatively connected to a wide area network 720, which may be the Internet or a part thereof. An Internet server 722 has data storage 724 and is connected to the wide area network 720, as is an Internet client computer 726. The server 722 may host a worldwide web/wireless application protocol server capable of serving worldwide web/wireless application protocol content to the mobile terminal 700.

A public switched telephone network (PSTN) 730 may be connected to the mobile telecommunications network 710 in a familiar manner. Various telephone terminals, including the stationary telephone 732, may be connected to the public switched telephone network 730.

The mobile terminal 700 is also capable of communicating locally via a local link 701 or 751 to one or more local devices 703 or 750. The local links 701 or 751 may be any suitable type of link with a limited range, such as for example Bluetooth, a Universal Serial Bus (USB) link, a wireless Universal Serial Bus (WUSB) link, an IEEE 802.11 wireless local area network (WLAN) link, an RS-232 serial link, etc. The local devices 703 can, for example, be various sensors that can communicate measurement values to the mobile terminal 700 over the local link 701. The above examples are not intended to be limiting, and any suitable type of link may be utilized. The local devices 703 may be antennas and supporting equipment forming a wireless local area network implementing Worldwide Interoperability for Microwave Access (WIMAX, IEEE 802.16), WiFi (IEEE 802.11x) or other communication protocols. The wireless local area network may be connected to the Internet. The mobile terminal 700 may thus have multi-radio capability for connecting wirelessly using mobile communications network 710, wireless local area network or both. Communication with the mobile telecommunications network 710 may also be implemented using WiFi, Worldwide Interoperability for Microwave Access, or any other suitable protocols, and such communication may utilize unlicensed portions of the radio spectrum (e.g. unlicensed mobile access (UMA)). In one embodiment, the navigation module 122 of FIG. 1 can include a communications module that is configured to interact with the system described with respect to FIG. 7.

Although the above embodiments are described as being implemented on and with a mobile communication device, it will be understood that the disclosed embodiments can be practiced on any suitable device incorporating a display, processor, memory and supporting software or hardware. In one embodiment, the system 100 of FIG. 1 may be for example, a personal digital assistant (PDA) style device 600' illustrated in FIG. 6B. The personal digital assistant 600' may have a keypad 610', a touch screen display 620', camera 621' and a pointing device 650 for use on the touch screen display 620'. In still other alternate embodiments, the device may be a personal computer, a tablet computer, touch pad device, Internet tablet, a laptop or desktop computer, a mobile terminal, a cellular/mobile phone, a multimedia device, a personal communicator, a television or television set top box, a digital video/versatile disk (DVD) or High Definition player or any other suitable device capable of containing for example a display 114 shown in FIG. 1, and supported electronics such as the processor 618 and memory 602 of FIG. 6A.

The user interface 102 of FIG. 1 can also include menu systems 124 coupled to the processing module 122 for allowing user input and commands. The processing module 122 provides for the control of certain processes of the system 100 including, but not limited to the controls for marking locations, uploading location information, adding content to locations and downloading location based services. The menu system 124 can provide for the selection of different tools and application options related to the applications or programs running on the system 100 in accordance with the disclosed embodiments. In one embodiment, the menu system 124 may provide for carrying out the aspects of the disclosed embodiments. In the embodiments disclosed herein, the process module 122 receives certain inputs, such as for example, signals, transmissions, instructions or commands related to the functions of the system 100, such as messages and notifications. Depending on the inputs, the process module 122 interprets the commands and directs the process control 132 to execute the commands accordingly in conjunction with the other modules, such as floating profile engine 136, places engine 137, maps engine 138 and location engine 140. The floating profile engine 136 can be configured to execute the processes related to the floating profile 204 described with reference to FIG. 2. The places engine 137 can be configured to execute the processes related to the places server 208. The maps engine 138 can be configured to execute the processes related to the map server 206. The location engine 140 can be used to store, retrieve and provide location coordinate data for locations.

Referring again to FIG. 1, the display 114 of the system 100 can comprise any suitable display, such as noted earlier, a touch screen display, proximity screen device or graphical user interface. In one embodiment, the display 114 can be integral to the system 100. In alternate embodiments the display may be a peripheral display connected or coupled to the system 100. A pointing device, such as for example, a stylus, pen or simply the user's finger may be used with the display 114. In alternate embodiments any suitable pointing device may be used. In other alternate embodiments, the display may be any suitable display, such as for example a flat display 114 that is typically made of an liquid crystal display (LCD) with optional back lighting, such as a thin film transistor (TFT) matrix capable of displaying color images. A touch screen may be used instead of a conventional liquid crystal display.

Figure 8:
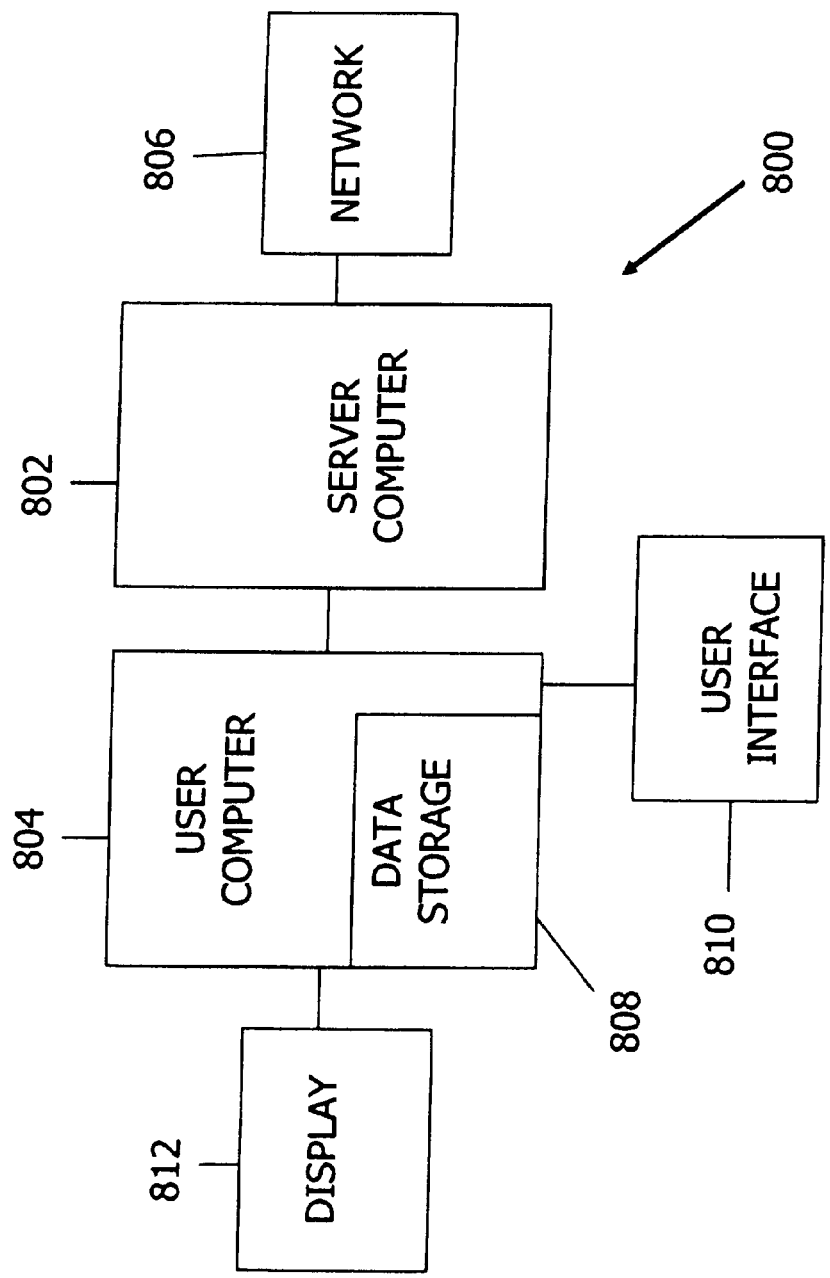
FIG. 8 is a block diagram illustrating the general architecture of an exemplary system in which the exemplary devices of FIGS. 6A and 6B may be used.

The disclosed embodiments may also include software and computer programs incorporating the process steps and instructions described above that are executed in different computers. FIG. 8 is a block diagram of one embodiment of a typical apparatus 800 incorporating features that may be used to practice aspects of the invention. The apparatus 800 can include computer readable program code means for carrying out and executing the process steps described herein. In one embodiment the computer readable program code is stored in a memory of the device. In alternate embodiments the computer readable program code can be stored in memory or memory medium that is external to the apparatus 800. The memory can be direct coupled or wireless coupled to the apparatus 800. As shown, a computer system 802 may be linked to another computer system 804, such that the computers 802 and 804 are capable of sending information to each other and receiving information from each other. In one embodiment, computer system 802 could include a server computer adapted to communicate with a network 806. Computer systems 802 and 804 can be linked together in any conventional manner including, for example, a modem, wireless, hard wire connection, or fiber optic link. Generally, information can be made available to both computer systems 802 and 804 using a communication protocol typically sent over a communication channel or through a dial-up connection on an integrated services digital network (ISDN) line or other such communication channel or link. In one embodiment, the communication channel comprises a suitable broad-band communication channel. Computers 802 and 804 are generally adapted to utilize program storage devices embodying machine-readable program source code, which is adapted to cause the computers 802 and 804 to perform the method steps and processes disclosed herein. The program storage devices incorporating aspects of the invention may be devised, made and used as a component of a machine utilizing optics, magnetic properties and/or electronics to perform the procedures and methods disclosed herein. In alternate embodiments, the program storage devices may include magnetic media, such as a diskette, disk, memory stick or computer hard drive, which is readable and executable by a computer. In other alternate embodiments, the program storage devices could include optical disks, read-only-memory ("ROM") floppy disks and semiconductor materials and chips.

Computer systems 802 and 804 may also include a microprocessor for executing stored programs. Computer 802 may include a data storage device 808 on its program storage device for the storage of information and data. The computer program or software incorporating the processes and method steps incorporating aspects of the invention may be stored in one or more computers 802 and 804 on an otherwise conventional program storage device. In one embodiment, computers 802 and 804 may include a user interface 810, and/or a display interface 812 from which aspects of the invention can be accessed. The user interface 810 and the display interface 812, which in one embodiment can comprise a single interface, can be adapted to allow the input of queries and commands to the system, as well as present the results of the commands and queries.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. A method comprising:
   receiving location data at a location-based service from a mobile device that indicates a marked location;
   determining a web page associated with the marked location; and
   adding descriptive content to the web page,
   wherein determining the web page associated with the marked location further comprises:
   determining whether the web page is already available in the location-based service; and
   in response to determining the web page is not already available, creating the web page associated with the marked location.

2. A method of claim 1, further comprising determining to publish the web page with the descriptive content for nodes on a network to access.

3. A method of claim 1, further comprising rendering the web page at a local display.

4. A method of claim 1, wherein the descriptive content includes at least one of image data, multimedia data or an evaluation comment about the webpage.

5. A method of claim 1, further comprising receiving information related to the marked location in response to initiating a query to the location-based service.

6. A method of claim 5, wherein the information related to the marked location includes a unique place identifier associated with the marked location.

7. A method of claim 1, wherein:
   the method is performed at the mobile device, and the received location data is based on a geographical position of the mobile device.

8. A method comprising:
   receiving location data from a mobile device on a network that indicates a marked location ;

determining a web page associated with the marked location; and sending data indicating the web page to the mobile device, wherein sending the data indicating the web page further comprises storing the data in a floating profile and forwarding data from the floating profile to the mobile device when the mobile device has access to the network.

9. A method of claim 8, wherein sending the data indicating the web page further comprises sending the data indicating the web page in response to determining that the web page has been updated.

10. An apparatus comprising:
at least one processor; and
at least one memory including computer program code for one or more programs,
the at least one memory and the computer program code configured to, with the at least one processor, cause the apparatus to perform at least the following,
receive location data at a location-based service from a mobile device that indicates a marked location;
determine a web page associated with the marked location; and
add descriptive content to the web page,
wherein determine the web page associated with the marked location further comprises:
determine whether the web page is already available in the location-based service; and
create the web page associated with the marked location in response to determining the web page is not already available.

11. An apparatus of claim 10, wherein the apparatus is further caused to determine to publish the web page with the descriptive content for nodes on a network to access.

12. An apparatus of claim 10, wherein the apparatus is further caused to render the web page at a local display.

13. An apparatus of claim 10, wherein the descriptive content includes at least one of image data, multimedia data or an evaluation comment about the webpage.

14. An apparatus of claim 10, wherein the apparatus is further caused to receive information related to the marked location in response to initiating a query to the location-based service.

15. An apparatus of claim 14, wherein adding descriptive content to the web page further comprises adding the information related to the marked location to the web page.

16. An apparatus of claim 10, wherein the apparatus is the mobile terminal, and further comprising:
user interface circuitry and user interface software configured to facilitate user control of at least some functions of the mobile phone through use of a display and configured to respond to user input; and
a display and display circuitry configured to display at least a portion of a user interface of the mobile phone, the display and display circuitry configured to facilitate user control of at least some functions of the mobile phone.

17. An apparatus of claim 16, wherein the received location data is based on a geographical position of the mobile terminal.

18. An apparatus comprising:
at least one processor; and
at least one memory including computer program code for one or more programs,
the at least one memory and the computer program code configured to, with the at least one processor, cause the apparatus to perform at least the following,
receive location data from a mobile device on a network that indicates a marked location;
determine a web page associated with the marked location; and
determine to send data indicating the web page to the node, wherein
determine to send data indicating the web page further comprises determine to store the data in a floating profile and to forward data from the floating profile to the mobile device when the mobile device has access to the network.

19. An apparatus of claim 18, wherein to determine to send the data indicating the web page further comprises to determine to send the data indicating the web page in response to determining that the web page has been updated.

* * * * *